(12) United States Patent
Hosaka et al.

(10) Patent No.: US 10,601,741 B2
(45) Date of Patent: Mar. 24, 2020

(54) MESSAGE TRANSMISSION DEVICE AND MESSAGE TRANSMISSION METHOD

(71) Applicants: Koji Hosaka, Tokyo (JP); Tetsuji Otsuka, Tokyo (JP); Chiyo Morisawa, Tokyo (JP); Manabu Shimizu, Tokyo (JP); Yosuke Magaki, Tokyo (JP)

(72) Inventors: Koji Hosaka, Tokyo (JP); Tetsuji Otsuka, Tokyo (JP); Chiyo Morisawa, Tokyo (JP); Manabu Shimizu, Tokyo (JP); Yosuke Magaki, Tokyo (JP)

(73) Assignees: THEONE UNICOM PTE. LTD., Singapore (SG); Koji Hosaka, Tokyo (JP)

( * ) Notice: Subject to any disclaimer, the term of this patent is extended or adjusted under 35 U.S.C. 154(b) by 226 days.

(21) Appl. No.: 15/628,643
(22) Filed: Jun. 21, 2017
(65) Prior Publication Data

US 2017/0295116 A1  Oct. 12, 2017

Related U.S. Application Data

(63) Continuation of application No. PCT/JP2015/085167, filed on Dec. 16, 2015.

(30) Foreign Application Priority Data

Dec. 24, 2014 (JP) .................... 2014-259894

(51) Int. Cl.
*G06F 15/16* (2006.01)
*H04L 12/58* (2006.01)
(Continued)

(52) U.S. Cl.
CPC .............. *H04L 51/04* (2013.01); *G06F 13/00* (2013.01); *H04L 51/02* (2013.01); *H04L 51/08* (2013.01);
(Continued)

(58) Field of Classification Search
CPC ......... H04L 51/04; H04L 51/02; H04L 51/08; G06F 13/00
(Continued)

(56) References Cited

U.S. PATENT DOCUMENTS 7,657,252 B2 * 2/2010 Futami ................... H04M 1/64
455/412.1
9,317,935 B2 * 4/2016 Kwon ..................... H04L 51/08
(Continued)

FOREIGN PATENT DOCUMENTS

JP   2005-354392 A   12/2005
JP   3135098 U    9/2007
(Continued)

OTHER PUBLICATIONS

International Search Report for PCT/JP2015/085167 dated Jan. 13, 2016.
PCT written opinion dated Jan. 13, 2016.

*Primary Examiner* — Bharat Barot
(74) *Attorney, Agent, or Firm* — Yokoi & Co., U.S.A.; Toshiyuki Yokoi

(57) ABSTRACT

Conventionally, high-level communication using the message cannot be achieved. The high-level communication using the message can be achieved by a message transmission device including a component candidate group storage unit capable of storing one or more component candidate groups including two or more groups of component candidates forming a content, an input reception unit configured to receive an input for constituting a content including one or more components determined by the selection of one component candidate from two or more component candidates included in one component candidate group, a content constitution unit configured to constitute the content by using the selected one or more components according to the input, and a message transmission unit configured to transmit a message including the content.

9 Claims, 20 Drawing Sheets

(51) Int. Cl.
  *G06F 13/00* (2006.01)
  *H04M 1/725* (2006.01)
(52) U.S. Cl.
  CPC ... *H04M 1/72544* (2013.01); *H04M 1/72547* (2013.01)
(58) Field of Classification Search
  USPC .................................................. 709/203–207
  See application file for complete search history.

(56) References Cited

U.S. PATENT DOCUMENTS

| | | | |
|---|---|---|---|
| 9,329,762 B1* | 5/2016 | Schultz | G06F 40/166 |
| 9,364,157 B2* | 6/2016 | Lu | G06T 7/262 |
| 2009/0244096 A1* | 10/2009 | Yamaji | G06T 11/00 345/630 |
| 2010/0031191 A1* | 2/2010 | Kim | G06F 16/4393 715/808 |
| 2013/0141456 A1* | 6/2013 | Sokolov | G06F 3/14 345/620 |
| 2013/0222299 A1* | 8/2013 | Heo | G06F 16/4393 345/173 |
| 2014/0258325 A1* | 9/2014 | Fan | G06F 16/2423 707/766 |
| 2016/0378776 A1* | 12/2016 | Green | G06F 16/9537 707/737 |
| 2017/0295116 A1* | 10/2017 | Hosaka | G06F 13/00 |

FOREIGN PATENT DOCUMENTS

| | | |
|---|---|---|
| JP | 2011-039570 A | 2/2011 |
| WO | 2009/133710 A | 11/2009 |

\* cited by examiner

Fig. 9

| ID | content candidate | emotion |
|---|---|---|
| 1 | | anger |
| 2 | | determination |
| 3 | | discontent |
| 4 | | query |
| 5 | | caution |
| 6 | | dislike |
| 7 | | surptise |
| 8 | | anxiety |

| ID | content candidate | emotion |
|---|---|---|
| 9 | | blankness |
| 10 | | confusion |
| 11 | | daze |
| 12 | | crying |
| 13 | | sadness |
| 14 | | boredom |
| 15 | | fear |

Fig. 11
| ID | keyword | background candidate |
|---|---|---|
| 1 | company | 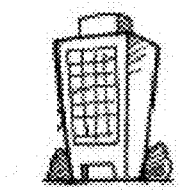 |
| 2 | school | 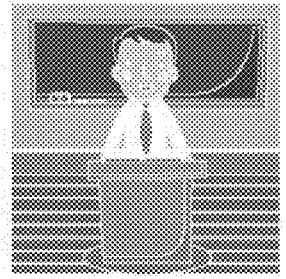 |
| 3 | home | 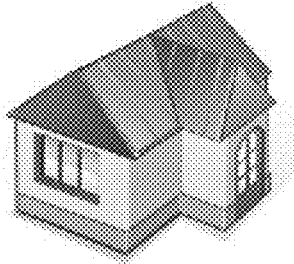 |
| 4 | station | 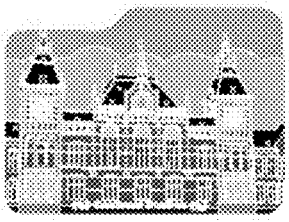 |
| ⋮ | ⋮ | ⋮ |

Fig. 15
①self-completion type (intransitive verb)
1–1 : entire body
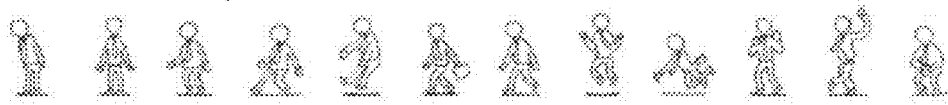
1–2 : hand gesture
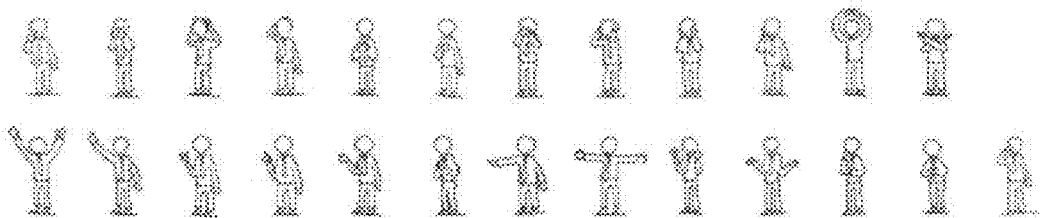
②object type (transitive verb)
2–1 : handshake
2–2 : goods
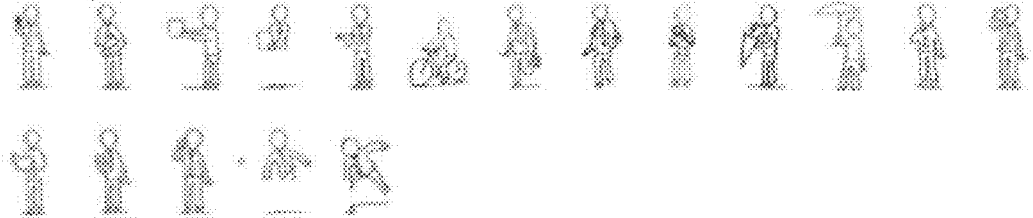
③crouching type
3–1 : chair
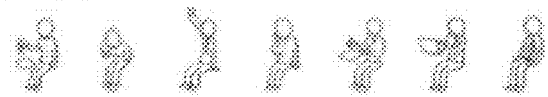
3–2 : ground
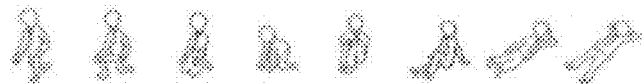

MESSAGE TRANSMISSION DEVICE AND MESSAGE TRANSMISSION METHOD

CROSS-REFERENCES TO RELATED APPLICATIONS

This application claims the benefit of priority and is a Continuation application of the prior International Patent Application No. PCT/JP2015/085167, with an international filing date of Dec. 16, 2015, which designated the United States, and is related to the Japanese Patent Application No. 2014-259894, filed Dec. 24, 2014, the entire disclosures of all applications are expressly incorporated by reference in their entirety herein.

BACKGROUND OF THE INVENTION

1. Field of the Invention

The present invention relates to a message transmission device or the like for transmitting messages.

2. Description of Related Art

Conventionally, the message transmission technology enabling to transmit messages using stamps was existed (e.g., shown in Non-patent document 1). In the above described message transmission technology, the stamp selected by a user from a preliminarily prepared group of stamps can be transmitted and the message formed by a letter string input by the user can be transmitted.

[Non-Patent Document 1] "LINE", [online], [searched on Dec. 5, 2014], Internet [URL: http://line.me/ja/]

BRIEF SUMMARY OF THE INVENTION

However, high-level communication using the message cannot be achieved in the conventional technology.

Specifically, the message containing the content formed by combining a plurality of components cannot be transmitted in the conventional technology.

In addition, the message containing the content easily created by continuously switching the components to select the components cannot be transmitted.

In addition, the message formed by combining the background selected by the user with the content input by the user cannot be created and transmitted.

In addition, the content formed by combining a plurality of components input by a continuous input unit and the message containing a dialogue corresponding to the content cannot be created and transmitted.

In addition, the message according to the situation such as user contexts and information of the application cannot be easily created and transmitted.

Furthermore, the message containing a face highly and easily expressing an emotion of a human cannot be created. Thus, high level communication cannot be achieved.

In the conventional technology, although a lot of stamps can be handled, the user cannot find the stamp matching the emotion and the message to be expressed very frequently.

The most important purpose of the present invention is to provide a message transmission device or the like that can create and transmit a message containing a content formed by combining a plurality of components. Thus, high level communication can be achieved one-to-one or multiple-to-one between users, although it cannot be achieved in the conventional technology.

The message transmission device of the first invention includes: a storage unit capable of storing two or more component candidate groups which are two or more component candidates constituting a content contained in a message; an input reception unit configured to receive a switching input by a continuous input unit which continuously switches the two or more component candidates included in the component candidate groups stored in the component candidate group storage unit for inputting a selection of the component candidates; a content constitution unit configured to constitute the content using the selected one, two or more component candidates according to the input received by the input reception unit; and a message transmission unit configured to transmit the message containing the content configured by the content constitution unit or transfer the message containing the content to a processing unit which is configured to transmit the message.

By using the above described configuration, the message containing the content formed by combining a plurality of components can be easily transmitted. Thus, high level communication using the message can be achieved.

In the message transmission device of the second invention, in addition to the configurations of the first invention, the two or more component candidates are three or more component candidates, and the three or more component candidates are changed gradually.

By using the above described configuration, the message for achieving high level communication can be easily created.

In the message transmission device of the third invention, in addition to the configurations of the second invention, the input reception unit further includes an output unit configured to receive a selection of one component candidate selected from the three or more component candidates by the switching input of the continuous input unit which can continuously switch the component candidates and output only the selected component candidate from the three or more component candidates.

By using the above described configuration, the message for achieving high level communication can be easily created.

In the message transmission device of the fourth invention, in addition to the configurations of the third invention, the output unit sequentially outputs two or more component candidates shifted by the switching input at a same position when the input reception unit receives the switching input of the continuous input unit.

By using the above described configuration, the message for achieving high level communication can be easily created.

In the message transmission device of the fifth invention, in addition to the configurations of any one of the first to fourth inventions, the component candidates and the components are a part of a face, and the content is the face.

By using the above described configuration, the message containing the content with the face formed by combining a plurality of components can be easily transmitted. Thus, high level communication using the message can be achieved.

In the message transmission device of the sixth invention, in addition to the configurations of any one of the first to fourth inventions, the component candidates and the components are a part of a body, and the content is the body.

By using the above described configuration, the message containing the content with the body formed by combining a plurality of components can be easily transmitted. Thus, high level communication using the message can be achieved.

In the message transmission device of the seventh invention, in addition to the configurations of any one of the first to sixth inventions, a background candidate group storage unit capable of storing two or more background candidate groups which are background candidates for constituting the message is further included and the input reception unit further has a message constitution unit configured to switch the background candidates to receive a selection of one background candidate from the two or more background candidates and constitute the message by using the content formed by the content constitution unit and the background candidate corresponding to the selection of the one background candidate, and the message transmission unit is configured to transmit the message formed by the message constitution unit.

By using the above described configuration, the message containing the background and the content can be easily transmitted. Thus, high level communication using the message can be achieved.

In the message transmission device of the eighth invention, in addition to the configurations of any one of the first to sixth inventions, the input reception unit further includes a message constitution unit configured to receive a dialogue corresponding to the content and constitutes the message using the content constituted by the content constitution unit and the dialogue received by the input reception unit, and the message transmission unit is configured to transmit the message constituted by the message constitution unit.

By using the above described configuration, the message containing the dialogue and the content can be easily transmitted. Thus, high level communication using the message can be achieved.

In the message transmission device of the ninth invention, in addition to the configurations of any one of the first to eighth inventions, an external information acquisition unit configured to acquire an external information: and an automatic selection unit configured to select one of the component candidate groups automatically using the external information are further included and the content constitution unit is configured to form the content using the one of the component candidate groups selected by the automatic selection unit.

By using the above described configuration, the message according to the situation can be easily transmitted. Thus, high level communication using the message can be achieved.

In the message transmission device of the tenth invention, in addition to the configurations of the ninth invention, the external information contains one or more user contexts.

By using the above described configuration, the message according to the user context can be easily transmitted. Thus, high level communication using the message can be achieved.

In the message transmission device of the eleventh invention, in addition to the configurations of the ninth invention, the external information contains one or more application information held by an application.

By using the above described configuration, the message according to the information held by the application stored in the message transmission device can be easily transmitted. Thus, high level communication using the message can be achieved.

In the message transmission device of the twelfth invention, in addition to the configurations of any one of the first to tenth inventions, at least one component candidate group of one or more component candidate groups stored in the storage unit include two, three or more component candidates expressing an emotion of a human.

By using the above described configuration, high level communication using the message containing the face highly and easily expressing the emotion of the human can be achieved.

By using the message transmission device of the present invention, high level communication using the message can be achieved.

BRIEF DESCRIPTION OF THE DRAWINGS

FIG. 9 is a drawing showing the content candidate group concerning the first embodiment.

FIG. 11 is a drawing showing the background candidate concerning the first embodiment.

FIG. 15 is a drawing showing the component candidate group of the body concerning the first embodiment.

DETAILED DESCRIPTION OF THE INVENTION

Figure 1:
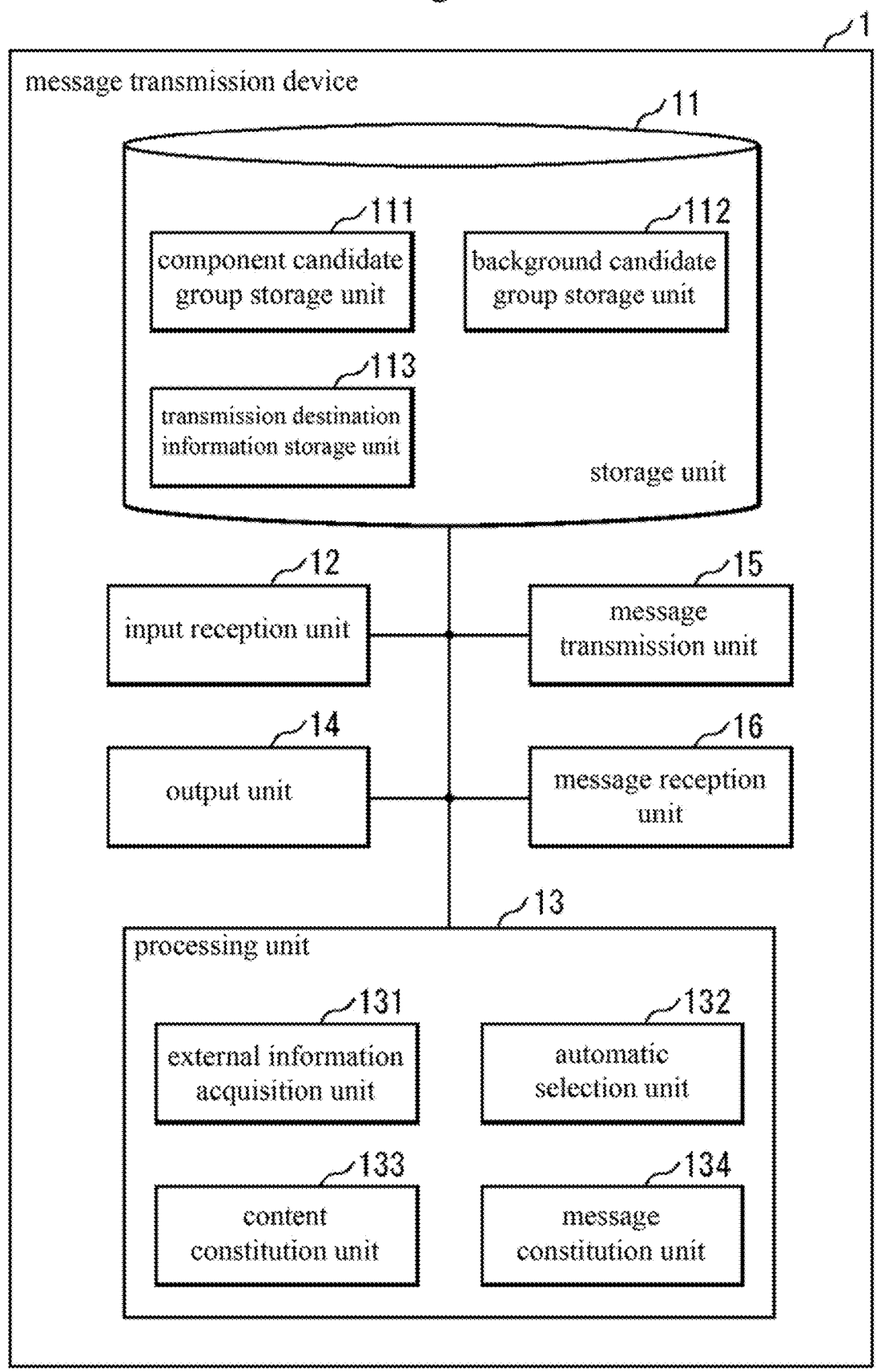
FIG. 1 is a block diagram of a message transmission device 1 concerning the first embodiment.

Hereafter, the embodiment of the message transmission device and other components will be explained with reference to the drawings. The elements indicated by the same reference numeral operate similarly. Hence, the repeated explanation may be omitted.

(First Embodiment)

In the embodiment of the present invention, the explanation is given for the message transmission device for transmitting the message containing the content formed by an assembly of two or more components obtained by adjusting the components using the continuous input unit. Note that the each of the components is a component of the face and a component of the body, for example.

In the embodiment of the present invention, the explanation is given for the message transmission device for transmitting the message containing the content formed in the situation that the components are sequentially displayed at a same position when components are adjusted using the continuous input unit.

In the embodiment of the present invention, the explanation is given for the message transmission device capable of selecting the background constituting the message using the continuous input unit and transmitting the message containing the selected background.

In the embodiment of the present invention, the explanation is given for the message transmission device for receiving a dialogue for constituting the message, constituting the message having the dialogue and the content and transmitting the message.

In the embodiment of the present invention, the explanation is given for the message transmission device for automatically selecting the component, content or the background based on the user context, the application information or the like, constituting the message and transmitting the message.

FIG. 1 is a block diagram of the message transmission device 1 concerning the present embodiment. One message transmission device 1 transmits the message to the other message transmission devices 1 or not-illustrated terminal devices. Normally, the message transmission device 1 can receive the message from the other message transmission devices 1 and output the message. Note that the kind of the message transmission device 1 is not limited. For example, a so-called smartphone, a tablet terminal, a personal computer, a cellular phone and a wearable terminal can be listed as the message transmission device 1.

The message transmission device 1 includes a storage unit 11, an input reception unit 12, a processing unit 13, an output unit 14, a message transmission unit 15 and a message reception unit 16.

The storage unit 11 includes a component candidate group storage unit 111, a background candidate group storage unit 112 and a transmission destination information storage unit 113.

The processing unit 13 includes an external information acquisition unit 131, an automatic selection unit 132, a content constitution unit 133 and a message constitution unit 134.

The storage unit 11 is capable of storing various information. The various information is, for example, a component candidate group, a background candidate group and a transmission destination information which will be explained later. The various information can be a content candidate group, for example. The content candidate group is an assembly of two, three, or more content candidates. The content candidate group is preferably an assembly of three or more content candidates having an order. Namely, each of the three or more content candidates constituting the content candidate group can be associated with an order identifier for identifying the order. In addition, each of the three or more content candidates constituting the content candidate group can be sequentially stored in a storage medium. Note that the content candidate is a candidate that is capable of constituting the content.

Although the content normally contains two or more components, the content can contain only one component. Although the content is normally a still image, the content can be a video, a sound, a letter string or an assembly of them. The data structure of the content is not limited.

When the content candidate group includes three or more component candidates, the three or more component candidates are preferably changed gradually. The three or more component candidates preferably have an order. Namely, each of the three or more component candidates constituting the component candidate group can be associated with an order identifier for identifying the order. In addition, each of the three or more component candidates constituting the component candidate group can be sequentially stored in a storage medium.

The component candidate group storage unit 111 is capable of storing one or more component candidate groups. The component candidate group includes two, three or more component candidates. The component candidate is an information that is capable of constituting the component. The component is a part constituting the content.

The component candidate group includes two or more component candidates. Two or more component candidates can be dynamically generated from one original data of the component candidate group. In such a case, the original data of the component candidate group can be considered to be the component candidate group itself. The two, three or more component candidates constituting the component candidate group preferably have an order.

The three or more component candidates are preferably changed gradually. Namely, the three or more component candidates constituting the component candidate group preferably have an order. Each of the three or more component candidates constituting the component candidate group can be associated with an order identifier for identifying the order. In addition, each of the three or more component candidates constituting the component candidate group can be sequentially stored in a storage medium. For example, when the component candidates have an order, it is preferred that the second component candidate is selected after the first component candidate, then the third component candidate is selected, and then the first component candidate is selected. Note that the three or more component candidates having an order are the components sequentially changed according to the indicated order. Of course, it is possible to select the second component candidate after the third component candidate, then select the first component candidate, and then select the third component candidate. Thus, the order can be reversed.

Each of the one or more component candidate groups can be associated with one or more external information. Each of the two or more component candidates included in the component candidate group can be associated with one, two or more external information.

The background candidate group storage unit 112 is capable of storing one or more background candidate groups. The background candidate group includes one, two or more background candidates. The background candidate is a candidate of the background constituting the message.

When the background candidate group includes three or more background candidates, the three or more background candidates preferably have an order. Each of the three or more background candidates constituting the background candidate group can be associated with an order identifier for identifying the order. In addition, each of the three or more background candidates constituting the background candidate group can be sequentially stored in a storage medium. Note that the message is the object to be transmitted. The message contains one or more kinds of information selected from the content, the background and the letter string, for example. In addition, the letter string is, for example, a dialogue which will be explained later.

Each of the one or more background candidates can be associated with one, two or more external information. Each of the two or more background candidates included in the background candidate group can be associated with one, two or more external information.

The transmission destination information storage unit 113 is capable of storing one or more transmission destination information. The transmission destination information is the information used when transmitting the message. The transmission destination information is the information indicating the transmission destination. The transmission destination information is, for example, an email address, an identification data, a phone number or the like. The transmission destination information can be the information for identifying the group indicating a plurality of transmission destinations, for example.

The input reception unit 12 receives an input. The input reception unit 12 preferably receives the input by using the continuous input unit. The input is an information, an instruction or the like. The input is, for example, the information for constituting the message. The message normally has a content. The message can have a dialogue. The dialogue is a letter string. The dialogue is normally uttered by a human, an animal or the like. The dialogue is preferably integrated with the content as a dialogue of the human and the animal which are the content. The dialogue is preferably expressed in a speech balloon of the human and the animal which are the content. The message can have a background. The background normally functions as a background of the content. The background is normally an image. However, the type and the structure of the data of the image are not limited. Note that the message preferably has three of the content, the background and the dialogue. In addition, the content here is preferably the content indicating a pose of the human. Namely, emotion and situation of a transmitter of the message can be easily expressed by the message having three information of the pose, the background and the dialogue. In addition, the message can have the information indicating time. The information indicating time is, for example, a figure of a clock, a letter string or the like showing the time. Note that the continuous input unit can also be regarded as a means for receiving the input.

The continuous input unit is an input means capable of continuously switching the selection of the candidate. The continuous input unit is, for example, an input interface (2001 in FIG. 2) in which points to be selected are formed in a circular arc shape, a slide bar (3001 in FIG. 3), a two-dimensional map (FIG. 4), an emotion map (5001 in FIG. 5), a scroll bar and the like.

Figure 2:
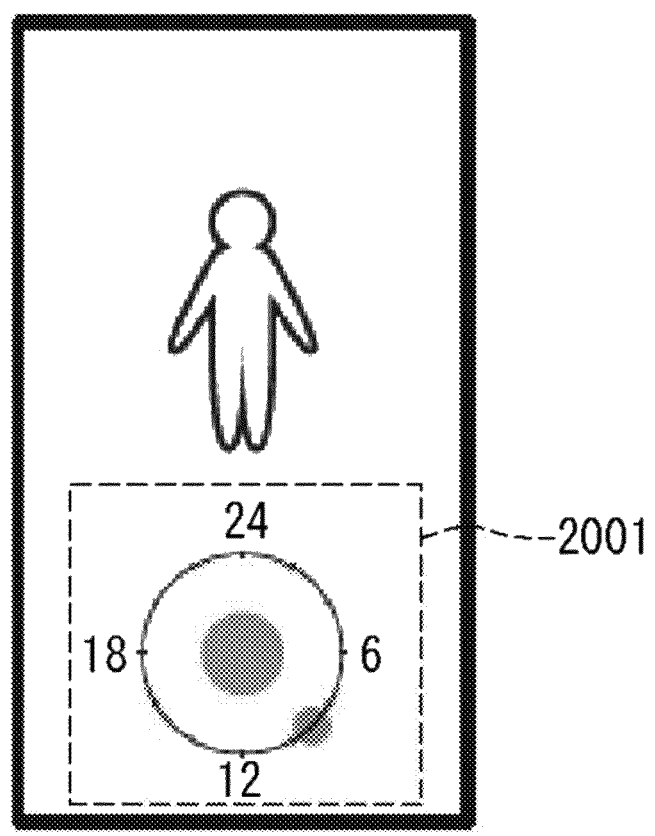
FIG. 2 is a drawing showing an example of the continuous input unit concerning the first embodiment.

In 2001 of FIG. 2, when the user traces within the circular area 2001 along the circular arc shape, the selection of the candidate is sequentially switched. Normally, in the input means of 2001, the candidate corresponding to the portion (area) tracked by the user is selected and outputted.

Figure 3:
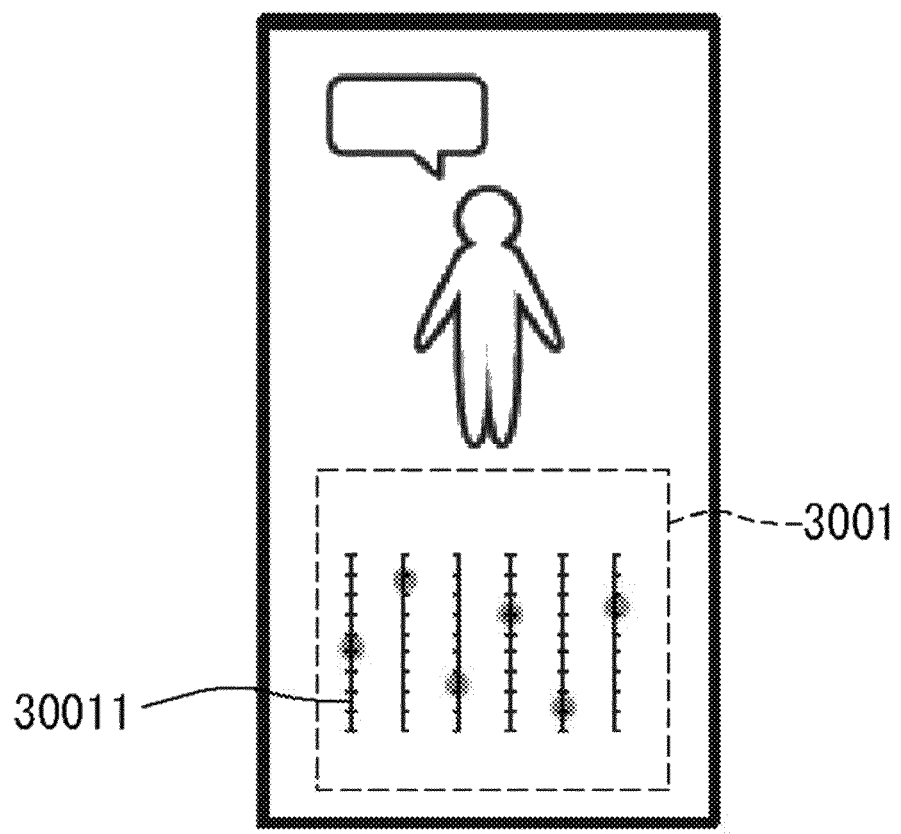
FIG. 3 is a drawing showing an example of the continuous input unit concerning the first embodiment.

In 3001 of FIG. 3, when the user tracks the bar (e.g., 30011) in 3001 from top to bottom (or from bottom to top) along the straight line of the bar, the selection of the candidate is sequentially switched.

Figure 4:
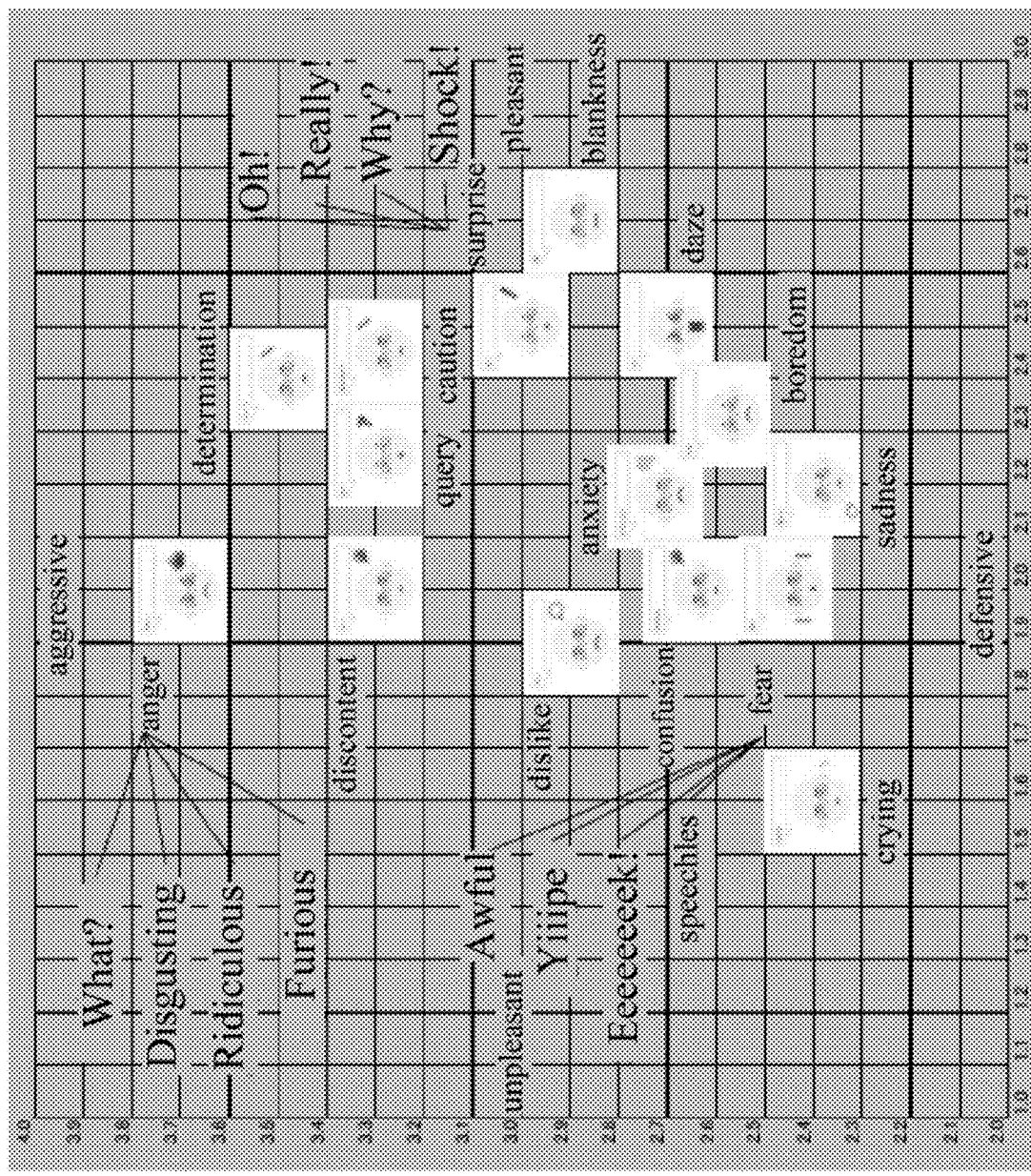
FIG. 4 is a drawing showing an example of the continuous input unit concerning the first embodiment.

The two-dimensional map of FIG. 4 is an interface enabling to select the face corresponding to the emotion of the human from the point or the area constituting the two-dimensional map. The two-dimensional map of FIG. 4 is an interface enabling to select the face corresponding to one emotion from the sequentially shifted emotions, where the vertical axis sequentially shifts "from defensive to aggressive" and the horizontal axis sequentially shifts "from unpleasant to pleasant". In FIG. 4, when the user instructs one point or area of the two-dimensional map, the component or the content corresponding to the instructed point or area is selected.

Figure 5:
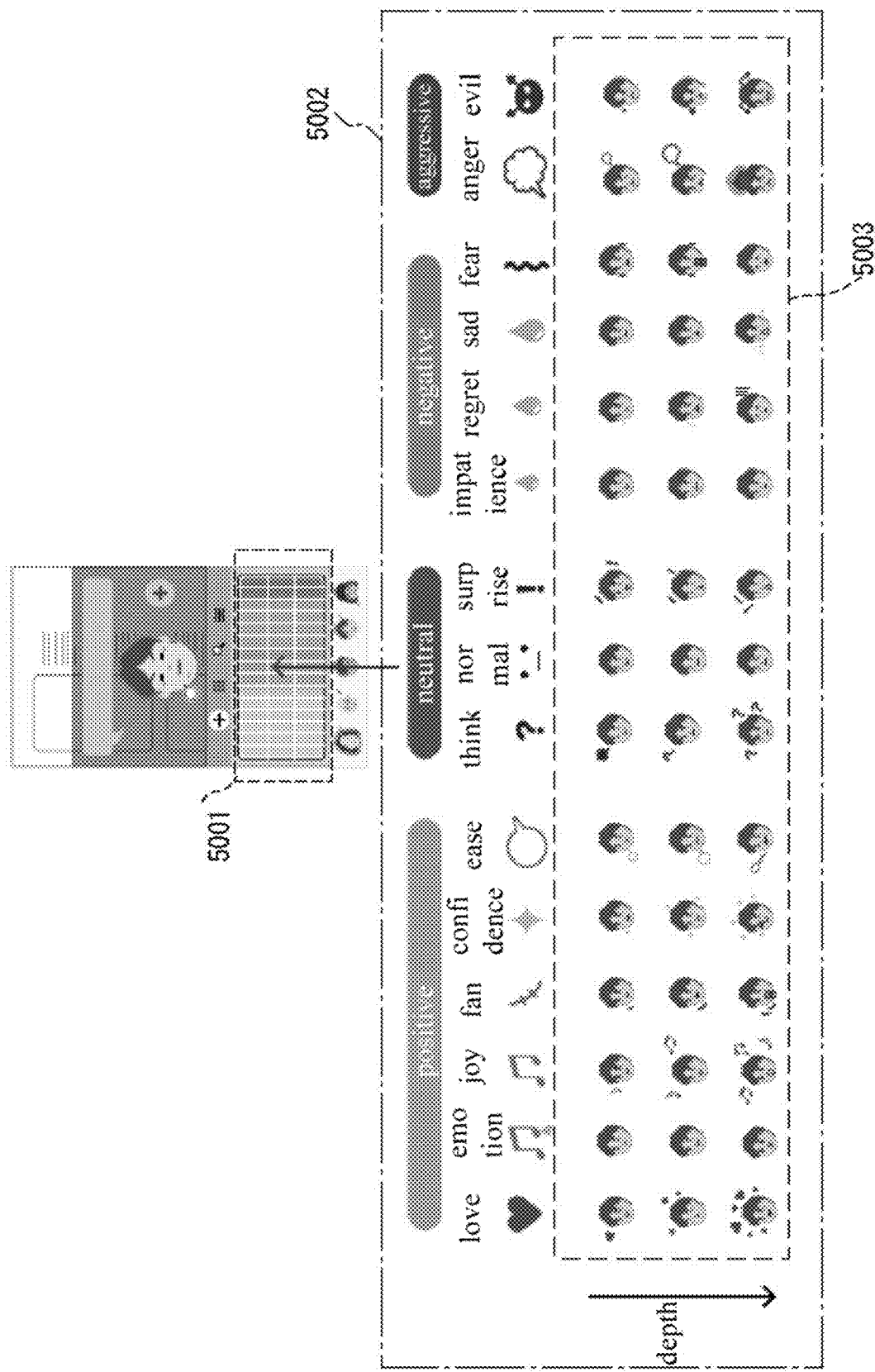
FIG. 5 is a drawing showing an example of the continuous input unit concerning the first embodiment.

In 5001 of FIG. 5, the contents of a large number of faces 5003 (15×3=45 faces in this example) in FIG. 5 are associated with each area (rectangular area in this example) of the two-dimensional map. The contents of a large number of faces are a content group where the emotion corresponding to the face gradually shifts in the order of "positive, neutral, negative, aggressive" according to the order of arrangement. Note that the emotions corresponding to a large number of faces 5003 are described at an upper part of 5002.

The input reception unit 12 receives the input for constituting the content containing one, two or more components by the continuous input unit. Note that one or more components contained in the content are components determined by selecting one component candidate from two or more component candidates included in one component candidate group. In addition, the component candidate group is stored in the component candidate group storage unit 111.

The input reception unit 12 can receive the selection of one component candidate from three or more component candidates by the continuous input unit.

The input reception unit 12 can receive the selection of one background candidate from two or more background candidates by the switching input of the continuous input unit.

The input reception unit 12 can receive the dialogue corresponding to the content. The input means of the dialogue is, for example, a character input means such as a soft keyboard. In addition, the input reception unit 12 can receive the letter string, the sound or the like which are other than the dialogue.

The above described sequential switching input can be also referred to as adjustment. When two or more component candidates constituting the component candidate group have an order and the selected component candidates are continuously switched by using the continuous input unit, the component candidates are sequentially selected one by one according to the order of the component candidate. When the selection of the candidate is continuously switched, it is preferred that gradually changing components are selected sequentially.

The three or more component candidates are preferably an information that is changed gradually.

The information and instruction received by the input reception unit 12 are, for example, a message creation instruction, a message transmission instruction, a message output instruction, a content candidate group acquisition instruction, a background candidate group acquisition instruction, a dialogue input instruction, and the like.

The message creation instruction is an instruction for creating the message. The message creation instruction can be the instruction for outputting the screen for selecting the content candidate group or the search conditions for narrowing the content candidate group, for example.

The message transmission instruction is an instruction for transmitting the message. The message transmission instruction can have the transmission destination information or the instruction for selecting the transmission destination information.

The message output instruction is an instruction for outputting the message. The message output instruction is normally the instruction for transmitting the message which is most recently created. The message output instruction is, for example, a press of "transmission" button.

The content candidate group acquisition instruction is an instruction for acquiring the content candidate group. The content candidate group acquisition instruction can be an expression of intention to create the content. The content candidate group acquisition instruction can be the instruction for selecting the content candidate group, the search conditions for narrowing the content candidate group, or the like.

The background candidate group acquisition instruction is an instruction for acquiring the background candidate group. The background candidate group acquisition instruction can be an expression of intention to create the background. The background candidate group acquisition instruction can be the instruction for selecting the background candidate group, the search conditions for narrowing the background candidate group, or the like.

The dialogue input instruction is an instruction for inputting the dialogue. The dialogue input instruction can be an expression of intention to input the dialogue.

The input reception unit 12 can receive the transmission destination information indicating the transmission destination to which the message is transmitted. In addition, the input reception unit 12 can receive the selection of the transmission destination information indicating the transmission destination to which the message is transmitted.

Here, the reception normally means the reception of the information input from the input devices such as a keyboard, a mouse, a touch panel and a wearable device. However, the concept of the reception also includes the reception of information transmitted via a wired or wireless communication line and the reception of the information read out from the storage medium such as an optical disk, a magnetic disk and a semiconductor memory.

The input means of the information, the instruction and the like can be anything such as a touch panel, a keyboard, a mouse and a menu screen. The input reception unit 12 can be achieved by a device driver of the input means such as a touch panel and keyboard or a control software of the menu screen, for example.

The processing unit 13 performs various processings. The various processings are the processings performed by the external information acquisition unit 131, the automatic selection unit 132, the content constitution unit 133, the message constitution unit 134 and the like which will be explained later.

The external information acquisition unit 131 acquires the external information which is the information of the outside. The external information contains, for example, one or more user contexts and one or more application information held by the application. The external information contains, for example, one or more user contexts. The user context is, for example, a static attribute of the user or a dynamic attribute of the user. The static attribute is, for example, a sex, an age, an address, a hobby and an occupation of the user. Note that the static attribute is stored in the storage unit 11, for example. The dynamic attribute is, for example, a weather, a location of the user and a time. Note that the dynamic attribute is acquired from a not-illustrated clock and a web server of the internet, for example.

The application information is, for example, a history information of electronic money used by the application which realizes an electronic money function. Note that the application information is stored in the storage unit 11, for example.

The detailed explanation of the process of acquiring the external information by the external information acquisition unit 131 is omitted since it is the conventionally known technology.

The automatic selection unit 132 selects, for example, one content candidate group, one content candidate, one component candidate group, one component candidate, one background candidate group, one background candidate, or one component candidate and one background candidate by using the external information acquired by the external information acquisition unit 131. In such a case, the component candidate or the like of the storage unit 11 is associated with the external information.

The automatic selection unit 132 selects one component candidate from the one component candidate group by using the external information acquired by the external information acquisition unit 131.

In addition, the automatic selection unit 132 selects one background candidate from the one background candidate group by using the external information acquired by the external information acquisition unit 131.

In addition, the automatic selection unit 132 selects one component candidate from the one component candidate group and one background candidate from the one background candidate group.

The content constitution unit 133 constitutes the content by using the selected one, two or more components according to the input received by the input reception unit 12.

In addition, the content constitution unit 133 acquires the selected content candidate according to the input received by the input reception unit 12. The content candidate is the content constituting the message to be transmitted.

The content constitution unit 133 can form the content by using the one component candidate selected by the automatic selection unit 132.

The message constitution unit 134 constitutes the message from the content constituted by the content constitution unit 133.

In addition, the message constitution unit 134 constitutes the message by using the content and the background which are constituted by the content constitution unit 133. The above described background is preferably the background candidate corresponding to the selection of the one background candidate received by the input reception unit 12.

The message constitution unit 134 can constitute the message by using the content constituted by the content constitution unit 133 and the dialogue received by the input reception unit 12. The above described dialogue is preferably integrated with the content. In addition, the above described dialogue preferably appears in a speech balloon of the content.

The message constitution unit 134 can constitute the message by using the content and the background which are constituted by the content constitution unit 133 and the dialogue received by the input reception unit 12.

The message constitution unit 134 can constitute the message by using the one, two or more component candidates selected by the automatic selection unit 132.

The message constitution unit 134 can constitute the message by using the one background candidate selected by the automatic selection unit 132.

The output unit 14 outputs the message during creation. Note that the message during creation preferably contains one or more information selected from the content, the background, the dialogue and the time, for example. The message during creation, for example, contains one or more components which constitute the content later.

When outputting the component, the output unit 14 preferably outputs only the component candidates selected by the switching input from the three or more component candidates. Here, the output of only the component candidates can be the output of the message containing only the component candidates selected by the switching input.

When the input reception unit 12 receives the switching input of the continuous input unit, the output unit 14 sequentially outputs two or more component candidates shifted by the switching input at a same position. The same position includes an approximately same position. The approximately same position means to allow deviation of the preliminarily determined area. Because of this, the output of the component candidates can be simulated, and the component candidates can be switched while checking the component candidates on the screen. Thus, the desired component can be easily selected and the selection can be easily redone.

When the input reception unit 12 receives the switching input of the continuous input unit, the output unit 14 sequentially outputs two or more content candidates shifted by the switching input at a same position. The same position includes an approximately same position. By doing this process, the output of the content candidates is simulated. The content candidates can be switched while checking the content candidates on the screen. Thus, the desired content can be easily selected and the selection can be easily redone. The approximately same position means to allow deviation of the preliminarily determined area.

The output unit 14 outputs the message that is received from the other message transmission devices 1 by the message reception unit 16.

Here, the output is normally the output to the display. However, the output is the concept including projection using a projector, printing using a printer, sound output, transmission to the external device, storage to the storage medium, transfer of the processing result to the other processing devices and other programs.

The message transmission unit 15 transmits the message containing the content constituted by the content constitution unit 133. Note that the message transmission unit 15 can transfer the message containing the content configured by the content constitution unit 133 to a processing unit (not illustrated) for transmitting the message. In such a case, the processing unit for transmitting the message transmits the transferred message. Note that the processing unit for transmitting the message is normally located at the outside of the message transmission device 1. The processing unit is, for example, "LINE (Registered trademark)" shown in Patent Document 1, "Twitter (Registered trademark)" and "Facebook (Registered trademark)."

The message transmission unit 15 transmits the message constituted by the message constitution unit 134. Note that the message transmission unit 15 can transfer the message constituted by the content constitution unit 133 to a processing unit (not illustrated) for transmitting the message. In such a case, the processing unit for transmitting the message transmits the transferred message. Note that the processing unit for transmitting the message is normally located at the outside of the message transmission device 1. The processing unit is, for example, "LINE (Registered trademark)" shown in Patent Document 1, "Twitter (Registered trademark)" and "Facebook (Registered trademark)."

The message reception unit 16 receives the message from the other message transmission devices 1.

The storage unit 11, the component candidate group storage unit 111, the background candidate group storage unit 112 and the transmission destination information storage unit 113 are preferably a nonvolatile storage medium. However, they can be achieved by a volatile storage medium.

The process of recording the information in the storage unit 11 or the like is not limited. For example, the information can be stored in the storage unit 11 or the like via the storage medium. Alternatively, the information transmitted via the communication line or the like can be stored in the storage unit 11 or the like. Alternatively, the information inputted via the input device can be stored in the storage unit 11 or the like.

The processing unit 13, the external information acquisition unit 131, the automatic selection unit 132, the content constitution unit 133 and the message constitution unit 134 can be usually achieved by an MPU, a memory or the like. Operating procedures of the processing unit 13 and the like are normally achieved by the software and software is stored in the storage medium such as a ROM. However, the operating procedures can be achieved by the hardware (dedicated circuit).

The output unit 14 can include the output devices such as a display and a speaker although the output devices can be considered not to include them. The output unit 14 can be achieved by a driver software of the external device or achieved by both the driver software of the external device and the external device itself.

The message transmission unit 15 is normally achieved by a wired or wireless communication means. However, the message transmission unit 15 can be achieved by a broadcasting means.

The message reception unit 16 is normally achieved by a wired or wireless communication means. However, the message reception unit 16 can be achieved by a means for receiving broadcast.

Then, the operation of the message transmission device 1 will be explained by using the flow chart of FIG. 6.

(Step S601) The input reception unit 12 judges whether or not the message creation instruction is received. If the message creation instruction is received, the procedure advances to Step S602. If the message creation instruction is not received, the procedure advances to Step S603.

(Step S602) The processing unit 13 creates a message. The procedure returns to Step S601. The message creation process will be explained by using the flow chart of FIG. 7 and FIG. 8.

(Step S603) The input reception unit 12 judges whether or not the message transmission instruction is received. If the message transmission instruction is received, the procedure advances to Step S604. If the message transmission instruction is not received, the procedure advances to Step S606.

(Step S604) The message constitution unit 134 constitutes the message to be transmitted. If the message is constituted before receiving the message transmission instruction, this step is skipped.

(Step S605) The message transmission unit 15 transmits the constituted message. The procedure returns to Step S601. Note that the message transmission unit 15 normally transmits the message to the transmission destination shown in the transmission destination information. Note that the transmission destination information indicating the transmission destination of the message can be included in the message creation instruction received in Step S601, can be included in the message transmission instruction received in Step S603, or can be the information inputted separately by the user.

(Step S606) The message reception unit 16 judges whether or not the message is received. If the message is received, the procedure advances to Step S607. If the message is not received, the procedure advances to Step S608.

(Step S607) The processing unit 13 stores the message received in Step S606 in the storage unit 11. The procedure returns to Step S601.

(Step S608) The input reception unit 12 judges whether or not the message output instruction is received. If the message output instruction is received, the procedure advances to Step S609. If the message output instruction is not received, the procedure returns to Step S601.

(Step S609) The output unit 14 reads out the message corresponding to the message output instruction received in Step S608 from the storage unit 11 and outputs the message. The procedure returns to Step S601.

Figure 6:
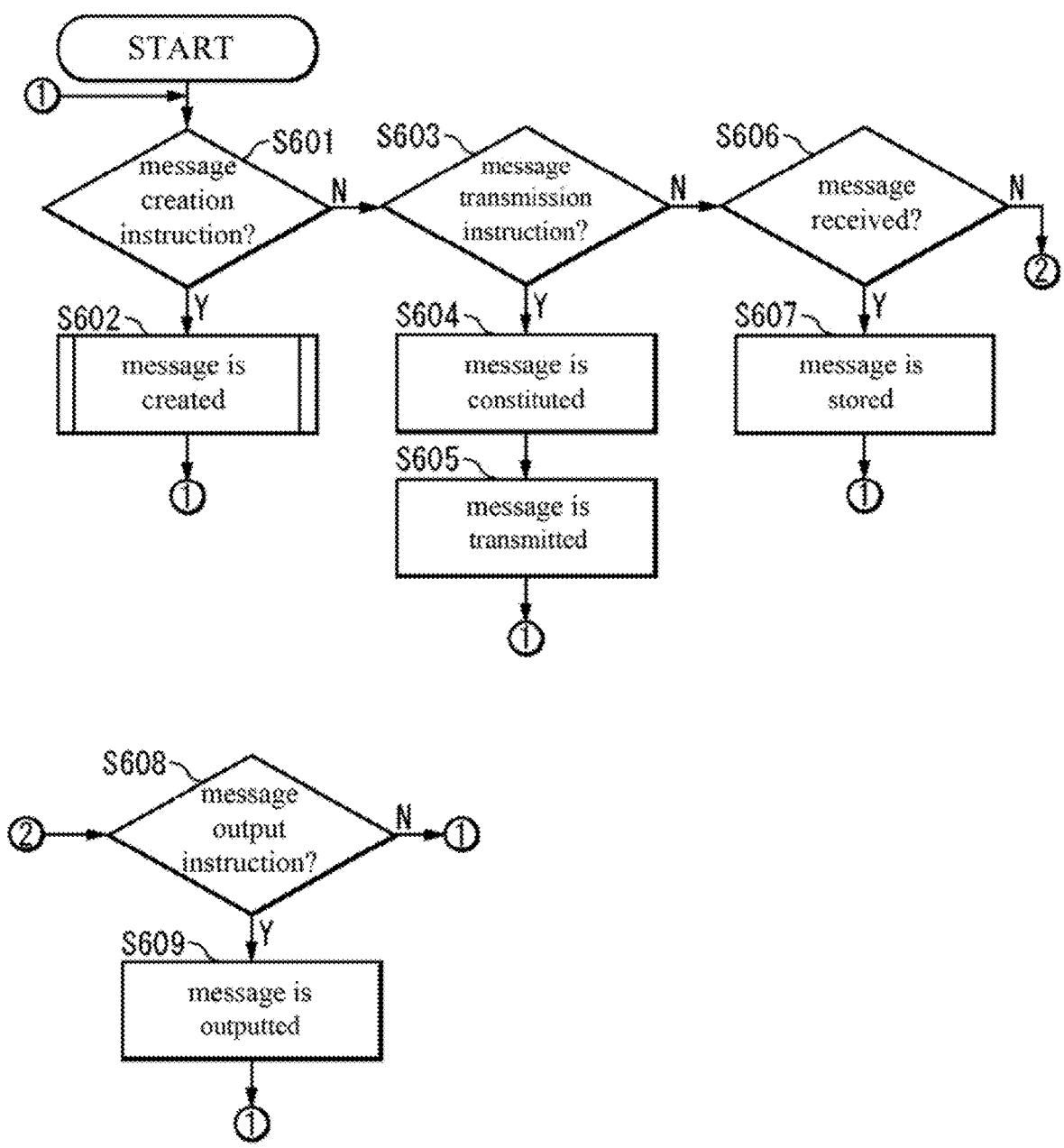
FIG. 6 is a flow chart for explaining an operation of the message transmission device 1 concerning the first embodiment.

Note that the process is finished when the power is turned off or finishing is interrupted in the flow chart of FIG. 6.

Figure 7:
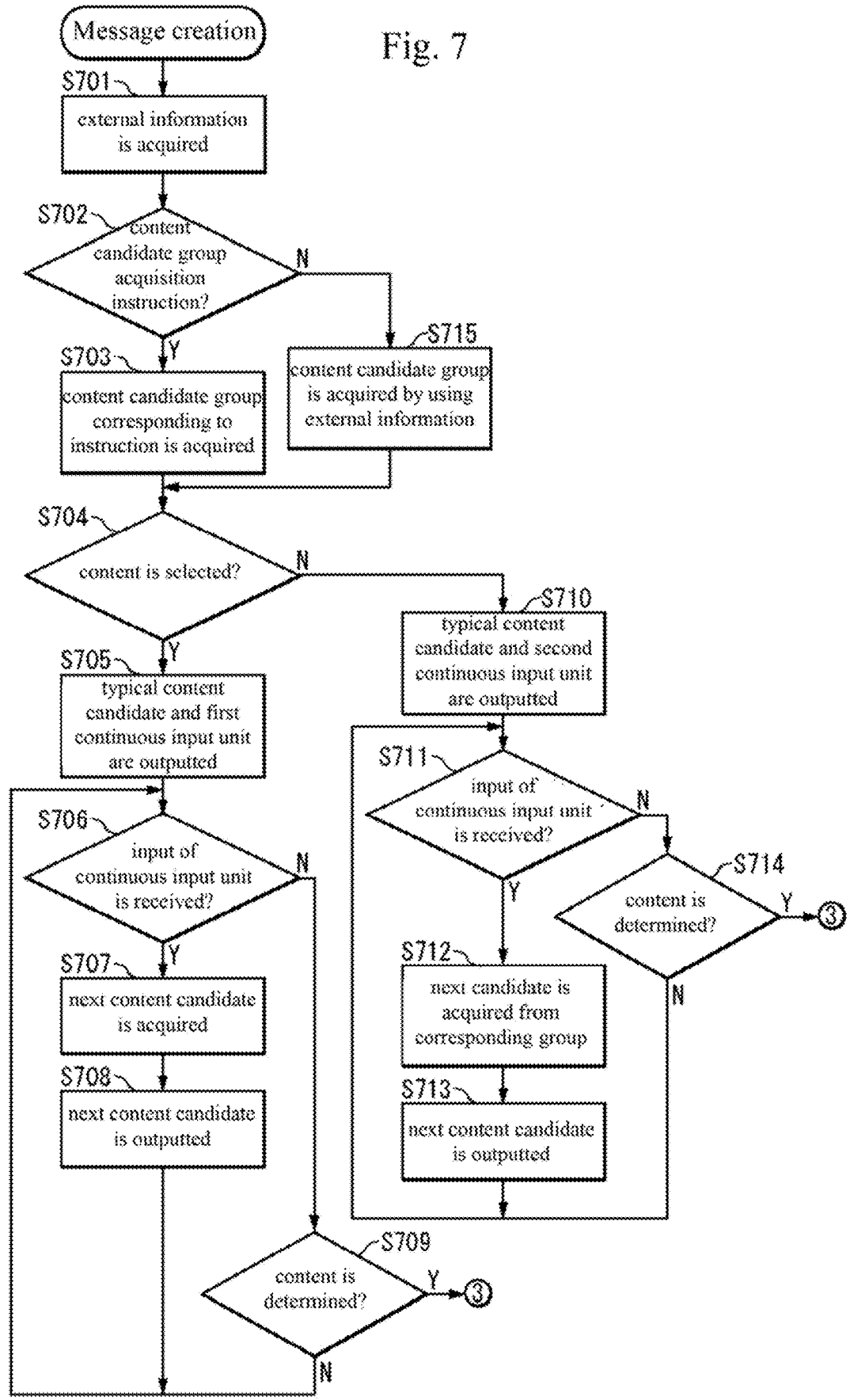
FIG. 7 is a flow chart for explaining the message creation process concerning the first embodiment.
Figure 8:
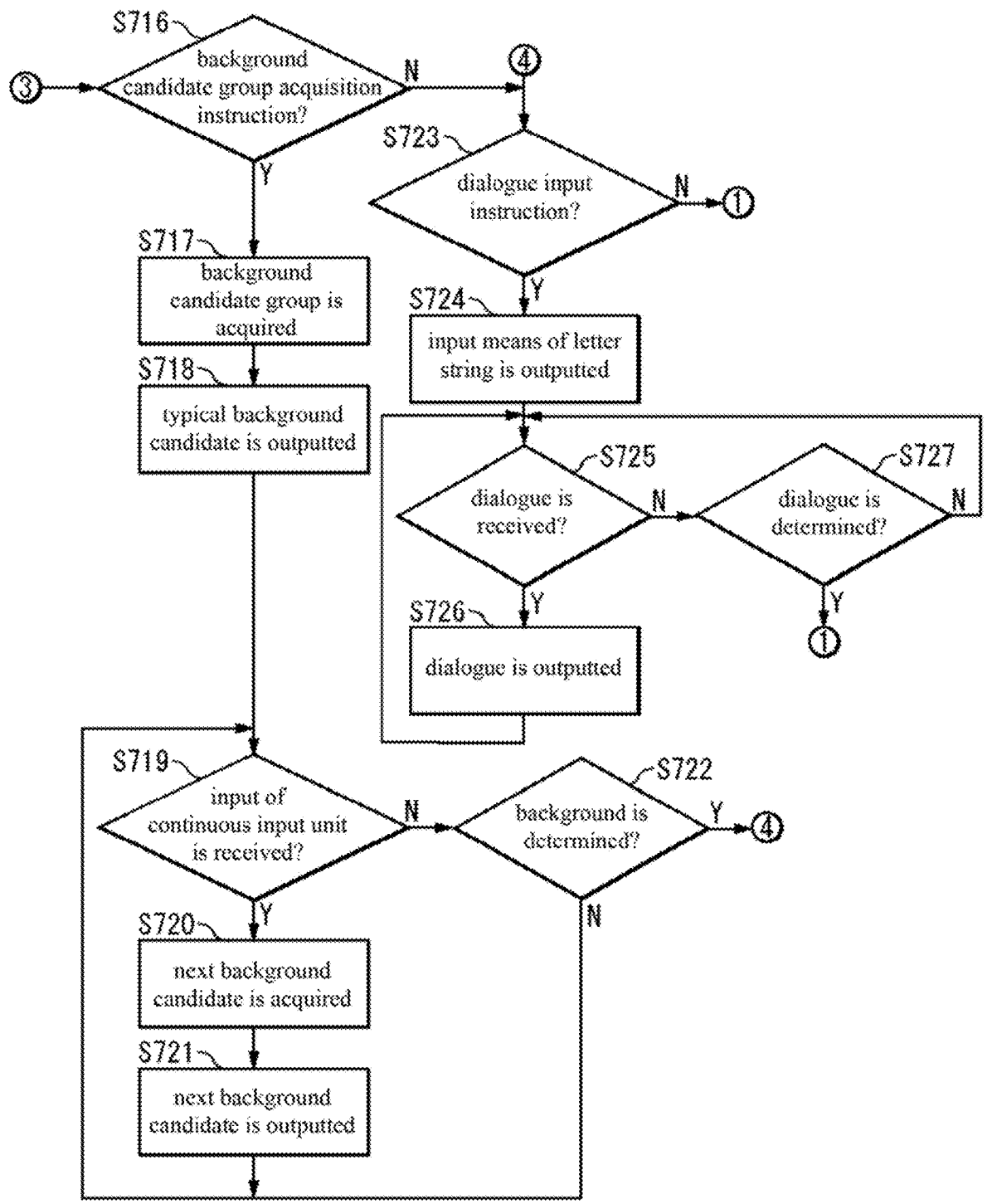
FIG. 8 is a flow chart for explaining the message creation process concerning the first embodiment.

Next, an example of the message creation process in Step S602 will be explained by using the flow chart of FIG. 7 and FIG. 8.

(Step S701) The external information acquisition unit 131 acquires the external information. Normally, the kind of the external information to be acquired is preliminarily determined.

(Step S702) The input reception unit 12 judges whether or not the content candidate group acquisition instruction is received. If the content candidate group acquisition instruction is received, the procedure advances to Step S703. If the content candidate group acquisition instruction is not received, the procedure advances to Step S715.

(Step S703) The content constitution unit 133 acquires the content candidate group corresponding to the content candidate group acquisition instruction from the storage unit 11.

(Step S704) The content constitution unit 133 judges whether the content is selected or the component constituting the content is selected by using the continuous input unit. If the content is selected, the procedure advances to Step S705. If the component is selected, the procedure advances to Step S710.

(Step S705) The output unit 14 outputs a screen including a typical content candidate and a first continuous input unit. The typical content candidate is one of the two or more content candidates included in the content candidate group acquired in Step S703. Note that the first continuous input unit is an example of the continuous input unit and the first continuous input unit is an input means for selecting the content candidate while continuously switching the content candidate.

(Step S706) The input reception unit 12 judges whether or not the input of the first continuous input unit is received. If the input is received, the procedure advances to Step S707. If the input is not received, the procedure advances to Step S709.

(Step S707) The content constitution unit 133 acquires the next content candidate with respect to the currently outputted content candidate.

(Step S708) The output unit 14 outputs the content candidate acquired in Step S707. The procedure returns to Step S706. Note that the output position of the content candidate is preferably same position as the output position of the currently outputted content candidate. After the content candidate acquired in Step S707 is outputted, the outputted content candidate is the currently outputted content candidate.

(Step S709) The content constitution unit 133 judges whether or not the content is determined. If the content is determined, the procedure advances to Step S716. If the content is not determined, the procedure returns to Step S706. Note that the content constitution unit 133 judges that the content is determined, for example, when the instruction is input from the user. In addition, the content constitution unit 133 judges that the content is determined, for example, when the instruction is not input from the user for the predetermined time period or more. In addition, the content constitution unit 133 judges that the content is determined, for example, when the background candidate group acquisition instruction is received.

(Step S710) The output unit 14 outputs a screen including a typical content candidate and a second continuous input unit. The typical content candidate is one of the two or more content candidates included in the content candidate group acquired in Step S703. Note that the second continuous input unit is an example of the continuous input unit and the second continuous input unit is an input means for selecting the component candidate constituting the content while continuously switching the component candidate. Note that the second continuous input unit can be same as the first continuous input unit.

(Step S711) The input reception unit 12 judges whether or not the input of the second continuous input unit is received. If the input is received, the procedure advances to Step S712. If the input is not received, the procedure advances to Step S714.

(Step S712) The content constitution unit 133 acquires the next component candidate with respect to the currently outputted component candidate. Here, the component candidate is included in the component candidate group constituting the currently outputted content candidate and corresponding to the input of the second continuous input unit.

(Step S713) The output unit 14 outputs the component candidate acquired in Step S712. The procedure returns to Step S711. Note that the output position of the component candidate is preferably same position as the output position of the currently outputted component candidate. After the component candidate acquired in Step S712 is outputted, the outputted component candidate is the currently outputted component candidate.

(Step S714) The content constitution unit 133 judges whether or not the content is determined. If the content is determined, the procedure advances to Step S716. If the content is not determined, the procedure returns to Step S711. Note that the content constitution unit 133 judges that the content is determined, for example, when the instruction is input from the user. In addition, the content constitution unit 133 judges that the content is determined, for example, when the instruction is not input from the user for the predetermined time period or more. In addition, the content constitution unit 133 judges that the content is determined, for example, when the background candidate group acquisition instruction is received.

(Step S715) The automatic selection unit 132 determines the content candidate group to be acquired by using the external information acquired in Step S701, and acquires the corresponding content candidate group from the storage unit 11. The procedure advances to Step S704.

(Step S716) The input reception unit 12 judges whether or not the background candidate group acquisition instruction is received. If the background candidate group acquisition instruction is received, the procedure advances to Step S717. If the background candidate group acquisition instruction is not received, the procedure advances to Step S723. The case of not receiving the background candidate group acquisition instruction is, for example, when the background is not contained in the message.

(Step S717) The message constitution unit 134 acquires the background candidate group corresponding to the background candidate group acquisition instruction received in Step S716 from the background candidate group storage unit 112. Note that the message constitution unit 134 can acquire the background candidate group corresponding to the external information from the background candidate group storage unit 112 by using the external information acquired in Step S701. Furthermore, the message constitution unit 134 can acquire the background candidate group corresponding to the external information acquired in Step S701 and the background candidate group acquisition instruction received in Step S716 from the background candidate group storage unit 112.

(Step S718) The output unit 14 acquires a typical background candidate and outputs it. The typical background candidate is one of the two or more background candidates included in the background candidate group acquired in Step S717. Note that the output unit 14 preferably outputs the typical background candidate at the position of the background of the content as the determined background of the content.

(Step S719) The input reception unit 12 judges whether or not the input of the continuous input unit is received. If the input is received, the procedure advances to Step S720. If the input is not received, the procedure advances to Step S722. Here, the continuous input unit can be the first continuous input unit, the second continuous input unit, or the third continuous input unit which is different from the first continuous input unit and the second continuous input unit.

(Step S720) The message constitution unit 134 acquires the next background candidate with respect to the currently outputted background candidate.

(Step S721) The output unit 14 outputs the background candidate acquired in Step S720. Note that the output unit 14 preferably outputs the background candidate acquired in Step S720 at the output position of the currently outputted background candidate. The procedure returns to Step S719. After the background candidate acquired in Step S720 is outputted, the outputted background candidate is the currently outputted background candidate.

(Step S722) The message constitution unit 134 judges whether or not the background is determined. If the background is determined, the procedure advances to Step S723. If the background is not determined, the procedure returns to Step S719. Note that the message constitution unit 134 judges that the background is determined, for example, when the instruction is input from the user. In addition, the message constitution unit 134 judges that the background is determined, for example, when the instruction is not input from the user for the predetermined time period or more. In addition, the message constitution unit 134 judges that the background is determined, for example, when the dialogue input instruction is received.

(Step S723) The input reception unit 12 judges whether or not the dialogue input instruction is received or not. If the dialogue input instruction is received, the procedure advances to Step S724. If the dialogue input instruction is not received, the procedure returns to Step S701. The case of not receiving dialogue input instruction is, for example, when the dialogue is not contained in the message.

(Step S724) The output unit 14 outputs the input means of the letter string.

(Step S725) The input reception unit 12 judges whether or not the dialogue is received. If the dialogue is received, the procedure advances to Step S726. If the dialogue is not received, the procedure advances to Step S727.

(Step S726) The output unit 14 outputs the dialogue received in Step S725. The procedure returns to Step S725. Note that the output unit 14 preferably outputs the dialogue at the position to which the dialogue should be outputted. The position to which the dialogue should be outputted is normally the position of the speech balloon corresponding to the human or the animal which are the content.

(Step S727) The message constitution unit 134 judges whether or not the dialogue is determined. If the dialogue is determined, the procedure returns to Step S701. If the dialogue is not determined, the procedure returns to Step S725. Note that the message constitution unit 134 judges that the dialogue is determined, for example, when the instruction is input from the user. In addition, the message constitution unit 134 judges that the dialogue is determined, for example, when the instruction is not input from the user for the predetermined time period or more.

Hereafter, specific operations of the message transmission device 1 in the present embodiment will be explained.

The storage unit 11 currently holds the content candidate group shown in FIG. 9, for example. The content candidate group shown in FIG. 9 consists of 15 content candidates. The content candidate group is an assembly of the content candidates having an order from "ID=1" to "ID=15." In the content candidate group shown in FIG. 9, the typical content candidate is assumed to be the content candidate having "ID=1." In the content candidate group shown in FIG. 9, when the next content candidate is selected by using the continuous input unit, the content candidate having "ID=1" is switched to the content candidate having "ID=2." In the content candidate group shown in FIG. 9, when the next content candidate is selected by using the continuous input unit in the state that the content candidate having "ID=15" is the current content candidate, the content candidate to be outputted is the content candidate having "ID=1." The content candidates constituting the content candidate group shown in FIG. 9 are contents corresponding to the emotion plotted on the emotional map formed by two axes of "from unpleasant to pleasant" and "from defensive to aggressive." The content candidates constituting the content candidate group shown in FIG. 9 are assumed to be aligned in the order of similarity of the emotion. Namely, each of the content candidates constituting the content candidate group shown in FIG. 9 have an order. Note that the order of the content candidates is the order of the ID shown in FIG. 9. Alternatively, the order of the content candidates can be a reverse order of the ID shown in FIG. 9. Namely, the user can sequentially select a plurality of content candidates in the order of the ID by using the continuous input unit, or sequentially select a plurality of content candidates in the reverse order of the ID.

In addition, the storage unit 11 is capable of storing the content candidate group having a two-dimensional order as shown as 5003 in FIG. 5. Namely, the content candidate group of 5003 is an assembly of the content candidates having an order where fifteen contents are aligned in the horizontal axis and three contents are aligned in the vertical axis.

Figure 10:
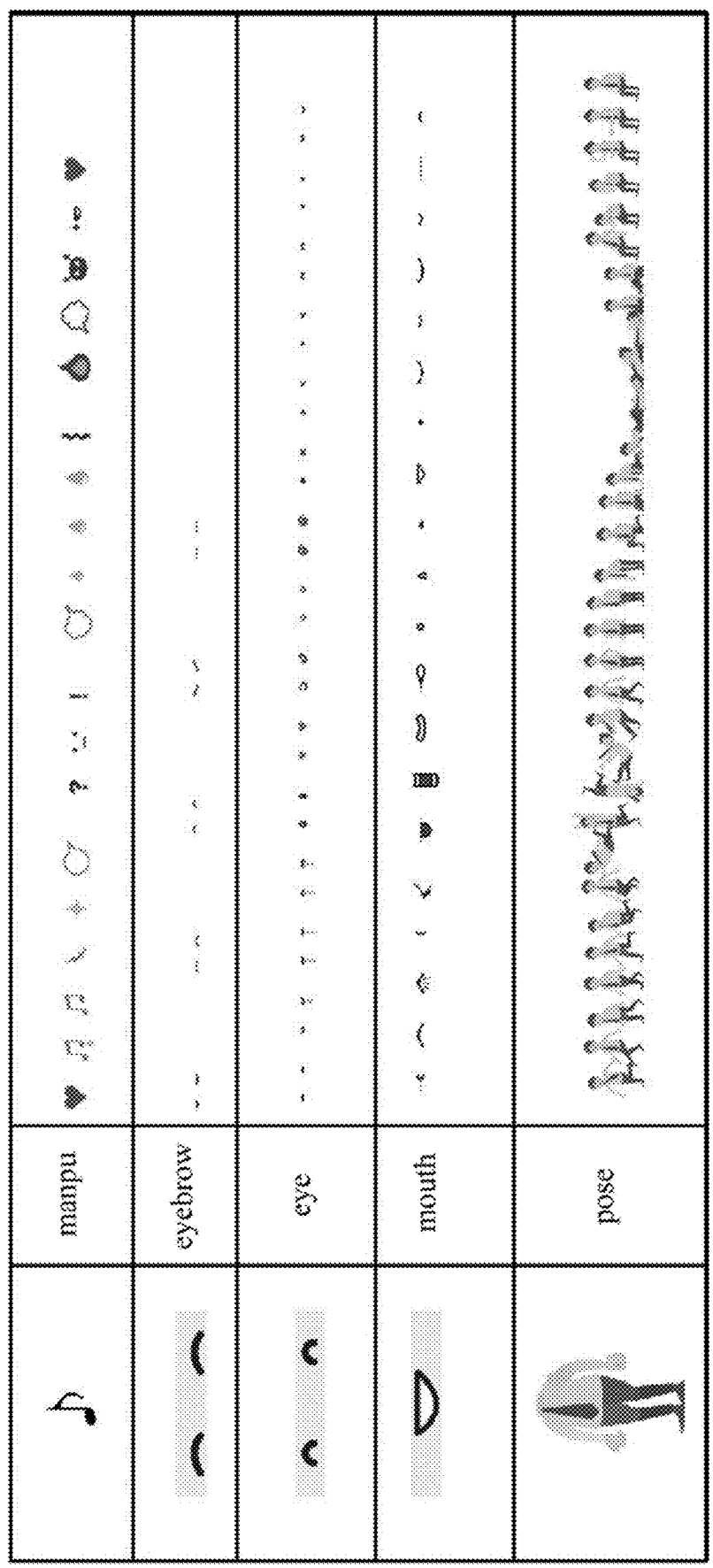
FIG. 10 is a drawing showing the component candidate group concerning the first embodiment.

In addition, the component candidate group storage unit 111 stores five component candidate groups shown in FIG. 10. Five component candidate groups are component groups of manpu (symbols used in comics), eyebrow, eye, mouth and pose. The content of the human is completed by selecting the component candidates respectively from the component groups of manpu, eyebrow, eye, mouth and pose. Note that manpu is a general term of the symbols for visualizing the emotion and the situation of the human or the like. Note that the user can sequentially select a plurality of component candidates in the arrangement order of FIG. 10 by using the continuous input unit, or sequentially select a plurality of component candidates in the reverse order of the arrangement order of FIG. 10.

Furthermore, the background candidate group storage unit 112 stores the background candidates shown in FIG. 11, for example. Each of the background candidates is stored while being associated with a keyword. Although the background candidates do not have an order in FIG. 11, the plurality of background candidates can have an order.

In the above described situation, the following three specific examples will be explained. The specific example 1 is a case of forming the message by selecting the content constituting the message from the content candidate group. The specific example 2 is a case of forming the message having the content, the background and the dialogue by selecting the component from the component candidate group to constitute the content. The specific example 3 is a case where the message contains the component, the background, the time and the dialogue.

SPECIFIC EXAMPLE 1

The user is assumed to currently input the message creation instruction into the message transmission device 1. Thus, the input reception unit 12 receives the message creation instruction.

Then, the processing unit 13 creates the message as follows. Namely, the external information acquisition unit 131 firstly acquires the external information. Here, the external information is assumed to be the time and the weather, for example.

Then, the user inputs the content candidate group acquisition instruction. Here, the content candidate group acquisition instruction is assumed to be an instruction of acquiring the content candidate group shown in FIG. 9. Thus, the input reception unit 12 receives the content candidate group acquisition instruction.

Then, the content constitution unit 133 acquires the content candidate group shown in FIG. 9 corresponding to the content candidate group acquisition instruction. Then, the content constitution unit 133 judges that the content is selected by using the continuous input unit. This is because the component corresponding to the content candidate group shown in FIG. 9 is not stored in the storage unit 11.

Figure 12:
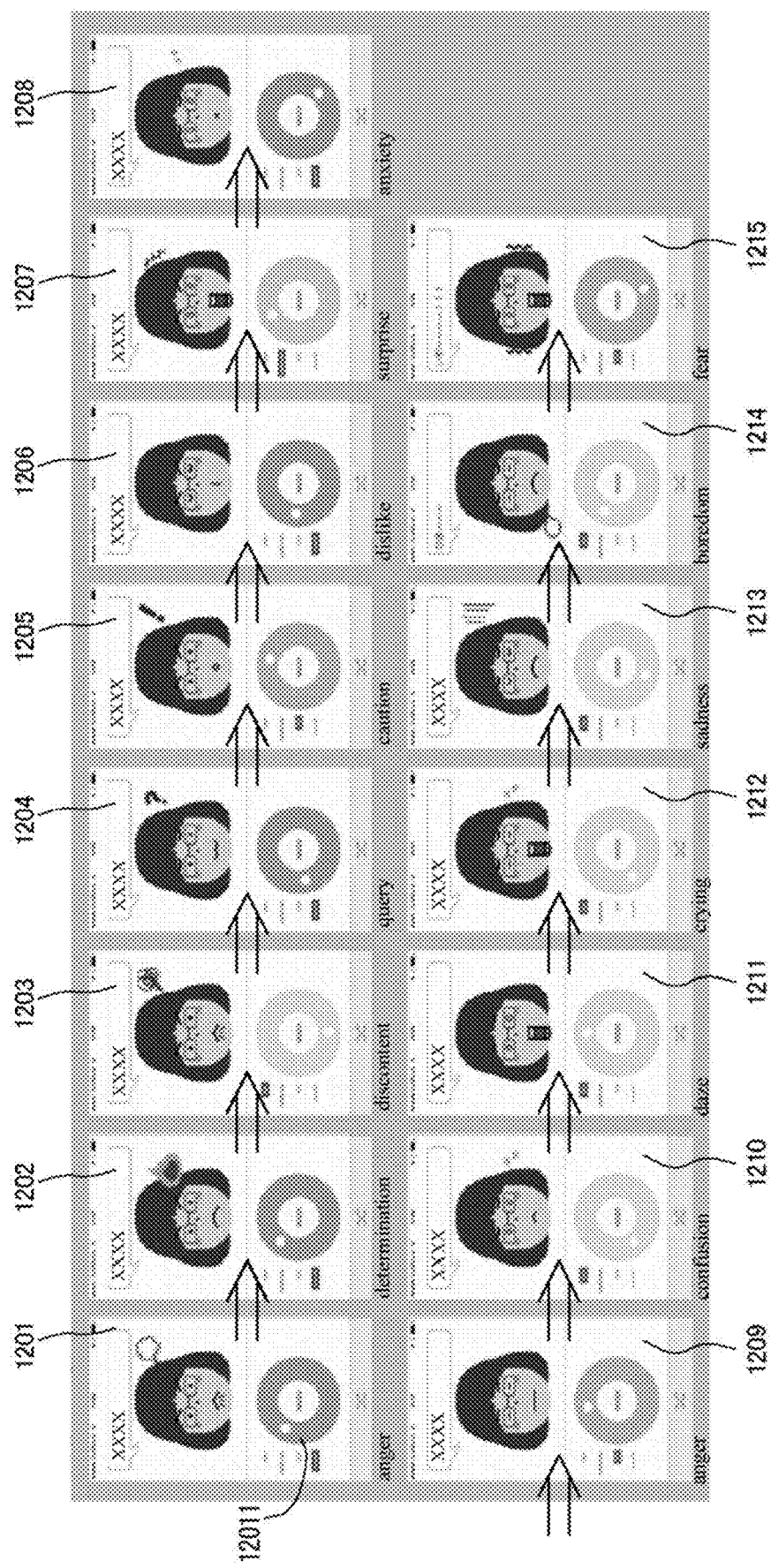
FIG. 12 is a drawing showing an example of the transition of the screen concerning the first embodiment.

Then, the output unit 14 outputs the screen including the typical content candidate and the first continuous input unit. The typical content candidate is one of the two or more content candidates included in the acquired content candidate group. Here, the first continuous input unit is assumed to be an interface shown as 2001 in FIG. 2. In addition, an example of the screen including the typical content candidate and the first continuous input unit is 1201 shown in FIG. 12. Note that the typical content candidate is the content candidate having "ID=1" in FIG. 9.

Then, the user is assumed to track the external area of the concentric circle 12011.

Thus, the input reception unit 12 receives the input of the first continuous input unit one after another.

Then, the content constitution unit 133 acquires the next content candidate ("ID=2" in FIG. 9) with respect to the currently outputted content candidate ("ID=1" in FIG. 9).

Then, the output unit 14 outputs the acquired content candidate. An example of the screen of this case is 1202 shown in FIG. 12.

Then, the content constitution unit 133 sequentially acquires the next content candidate, and the output unit 14 sequentially outputs the acquired content candidates.

Then, the screen output from the output unit 14 is assumed to be shifted from 1202, 1203, 1204 and then 1215.

Then, the user is assumed not to input the background. Then, the user is assumed to input the dialogue input instruction.

Then, the input reception unit 12 receives the dialogue input instruction. Then, the output unit 14 outputs the input means of the letter string.

Then, the user is assumed to input the dialogue "Nooooo!!!." Thus, the input reception unit 12 receives the dialogue "Nooooo!!!." Then, the output unit 14 outputs the received dialogue.

Then, the user is assumed to input the message transmission instruction. Thus, the input reception unit 12 receives the message transmission instruction.

Then, the message constitution unit 134 constitutes the message to be transmitted. Note that the message to be transmitted includes the content candidate of "ID=15" in FIG. 9 and the dialogue "Nooooo!!!."

Then, the message transmission unit 15 transmits the constituted message. Note that the transmission destination of the message is not limited.

SPECIFIC EXAMPLE 2

The user is assumed to currently input the message creation instruction into the message transmission device 1. Thus, the input reception unit 12 receives the message creation instruction. Thus, the processing unit 13 outputs the screen 1301 shown in FIG. 13. The screen 1301 is a screen for selecting the content candidate group. Note that each of the content candidate groups of the screen 1301 is assumed to be stored in the storage unit 11.

Then, the processing unit 13 creates the message as follows. Namely, the external information acquisition unit 131 firstly acquires the external information. Here, the external information is assumed to be the time and the weather, for example.

Figure 13:
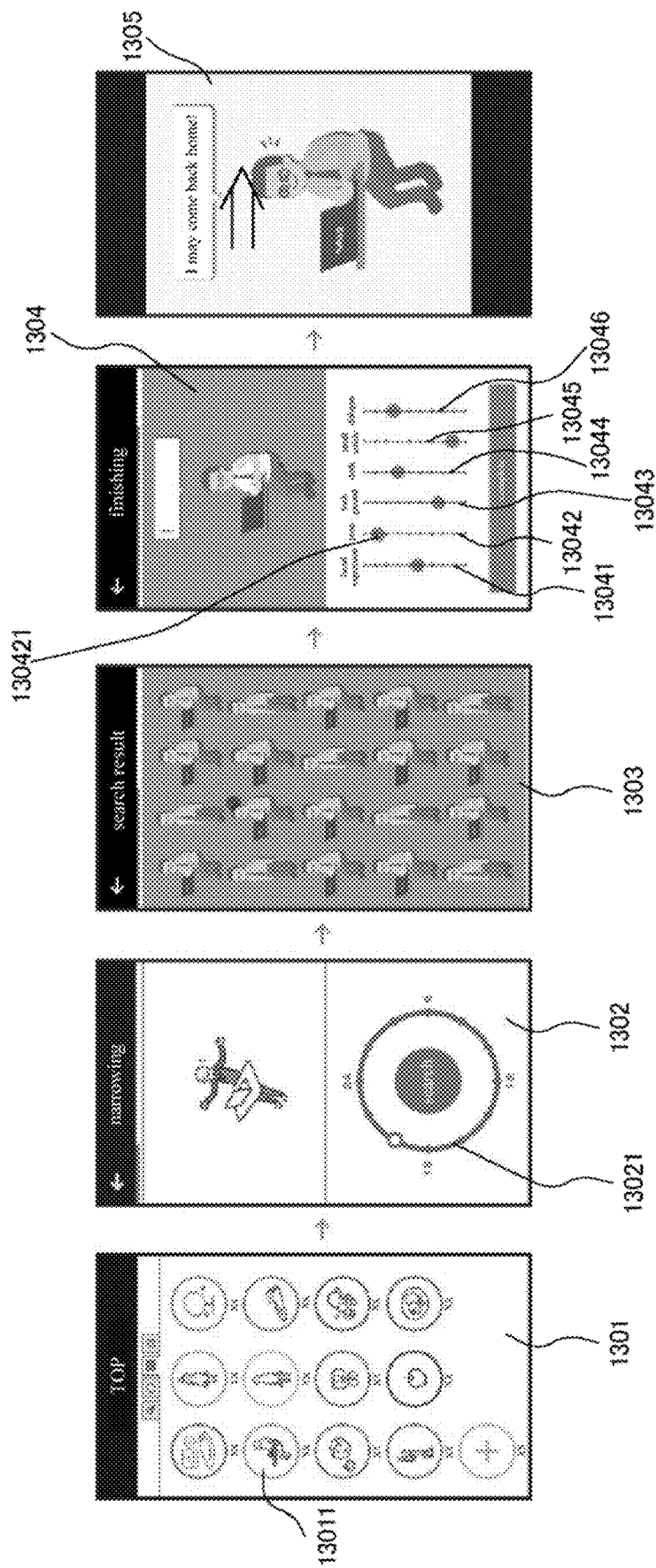
FIG. 13 is a drawing showing an example of the transition of the screen concerning the first embodiment.

Then, the user is assumed to press the button 13011 corresponding to one of the content candidate groups in the screen 1301 of FIG. 13 to input the content candidate group acquisition instruction. Thus, the typical content candidate group is outputted from the content candidate groups corresponding to the button 13011. An example of the screen of this case is 1302 shown in FIG. 13.

Then, the user selects the time by using the continuous input unit 13021 of the screen 1302 shown in FIG. 13. Note that the content candidate group is stored in the storage unit 11 while being associated with each point (time) of the continuous input unit 13021. The user is assumed to currently press the point of 20 o'clock which is near the time to leave the office.

Thus, the input reception unit 12 receives the acquisition instruction of the content candidate group which is associated with the time of 20 o'clock.

Then, the content constitution unit 133 acquires the content candidate group corresponding to the time of 20 o'clock from the storage unit 11.

Then, the output unit 14 outputs the content candidates constituting the content candidate group acquired by the content constitution unit 133 as shown as 1303 in FIG. 13.

Then, the user is assumed to select one of the content candidates from a large number of content candidates 1303 shown in FIG. 13.

Thus, the input reception unit 12 receives the selection of the one of the content candidates. Then, the content constitution unit 133 acquires the selected content candidate from the storage unit 11. Then, the output unit 14 outputs the screen including the content candidate and the second continuous input unit. An example of the output of this case is 1304 shown in FIG. 13. Note that the component candidate group, which is capable of constituting the content candidate, is assumed to be stored in the component candidate group storage unit 111.

Note that the processing unit 13 detects that the component candidate group which is capable of constituting the content candidate is stored in the component candidate group storage unit 111, and acquires the screen including the content candidate and the second continuous input unit. Then, the output unit 14 outputs the screen including the content candidate and the second continuous input unit.

Then, the user is assumed to instruct the second continuous input unit 13042. Then, the user is assumed to track the bar of 13042 to move the current point 130421 on the bar.

Thus, the input reception unit 12 receives the input of the second continuous input unit 13042 one after another.

Then, the content constitution unit 133 sequentially reads out the component candidates of the pose corresponding to the second continuous input unit 13042 in accordance with the order. Then, the output unit 14 sequentially outputs the component candidates which are sequentially read out by the content constitution unit 133.

Similarly, the user is assumed to make an input into the second continuous input unit 13041 corresponding to the component candidate group of the facial expression, the second continuous input unit 13044 corresponding to the component candidate group of the cloth, and the second continuous input unit 13045 corresponding to the component candidate group of the small article.

Thus, similar to the input into the second continuous input unit 13042, the component candidate of the facial expression, the component candidates of the cloth and the component candidate of the small article are sequentially selected and outputted. Then, the component candidate corresponding to the position where the input of the user is stopped is selected as a component.

By the above described processing, the content is assumed to be completed.

Similarly, the user is assumed to make an input into the second continuous input unit 13043 corresponding to the component candidate group of the background.

Thus, similar to the input into the second continuous input unit 13042, the background candidates are sequentially selected and outputted. Then, the background candidate corresponding to the position where the input of the user is stopped is selected as a component. Then, the background is assumed to be completed.

Then, the user is assumed to instruct the input unit 13046. This instruction is the dialogue input instruction.

Then, the output unit 14 outputs the input means of the letter string. Then, the user is assumed to input the letter string "I may come back home!." Thus, the input reception unit 12 receives the dialogue "I may come back home." Then, the output unit 14 outputs the received dialogue.

Then, the message constitution unit 134 constitutes the message containing the content, the background and the dialogue which are inputted.

Then, the user is assumed to input the message transmission instruction. Thus, the input reception unit 12 receives the message transmission instruction.

Then, the message transmission unit 15 transmits the constituted message. Note that the transmission destination of the message is not limited.

Figure 14:
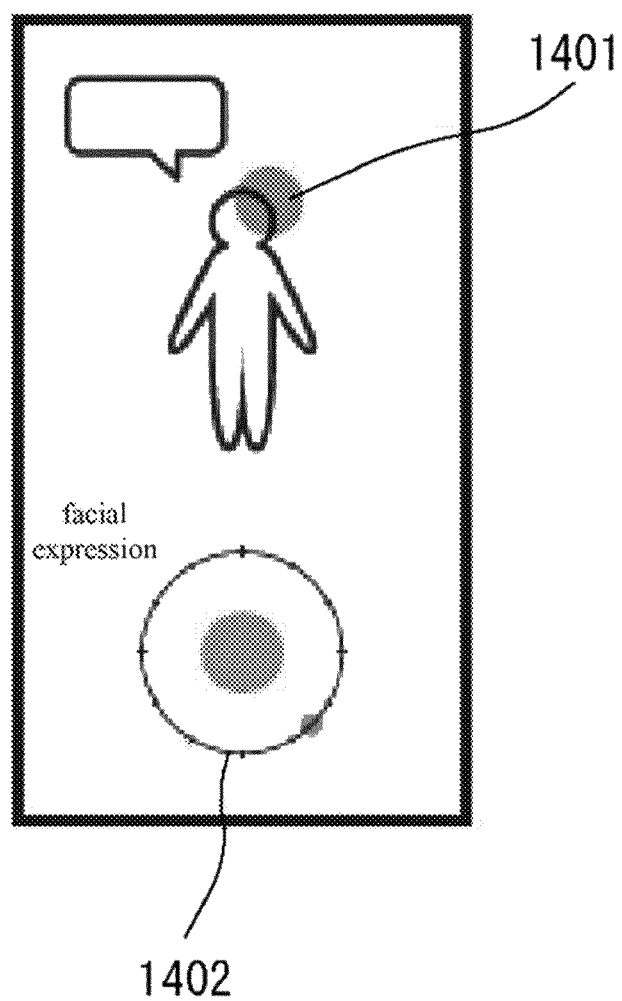
FIG. 14 is a drawing showing an example of the continuous input unit concerning the first embodiment.

Note that 13041 and the like of 1304 shown in FIG. 13 are the continuous input unit. However, as shown in FIG. 14, the component to be adjusted can be determined by instructing a part of the outputted content candidate (e.g., 1401). Note that the decision of the component to be adjusted is the decision of the component candidate group to be selected.

Then, the component to be adjusted can be selected from a plurality of component candidates by using the input interface (same as 2001 shown in FIG. 2) formed in a concentric circle shape.

SPECIFIC EXAMPLE 3

The user is assumed to currently input the message creation instruction into the message transmission device 1. Thus, the input reception unit 12 receives the message creation instruction. Note that the message creation instruction here is assumed to be the instruction for acquiring the component candidate group formed by an assembly of the components of "body." Note that the component candidate group formed by an assembly of the components of "body" is stored in the component candidate group storage unit 111. An example of the component candidate group of this case is FIG. 15.

Then, the output unit 14 outputs the component candidate group shown in FIG. 15.

Then, the user selects one body from the component candidate group shown in FIG. 15 by using the continuous input unit. Thus, the input reception unit 12 receives the selection.

Figure 16:
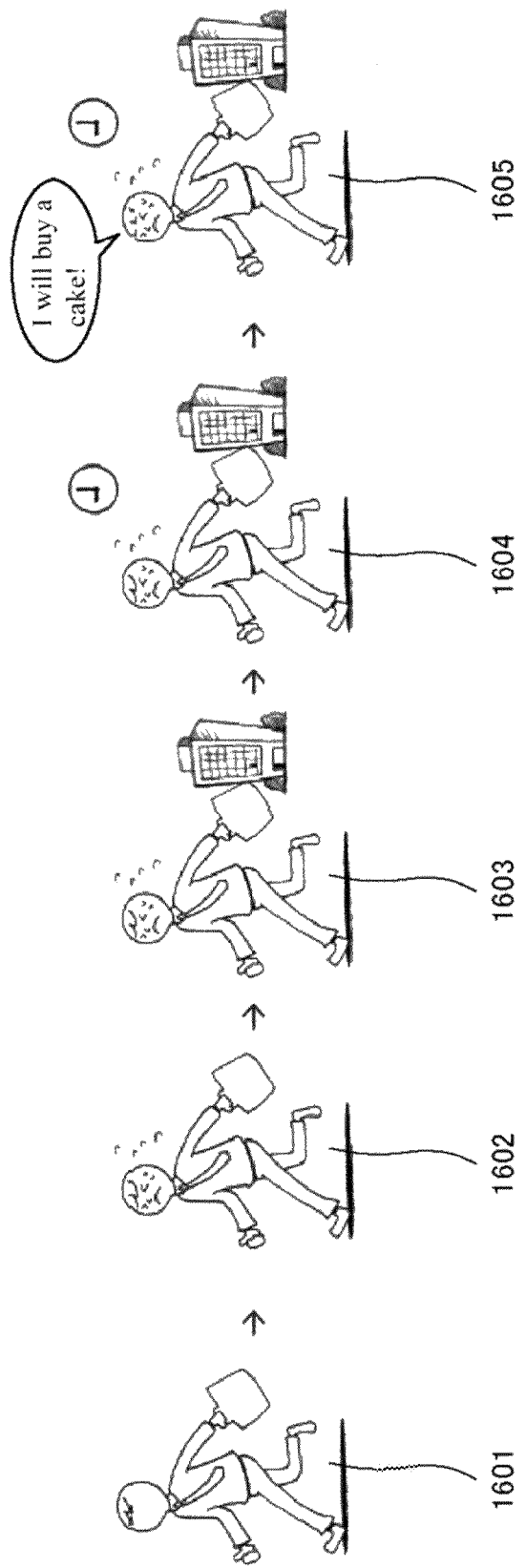
FIG. 16 is a drawing showing an example of the transition of the message creation concerning the first embodiment.

Then, the content constitution unit 133 acquires the selected component candidate of the body from the component candidate group storage unit 111. Then, the output unit 14 outputs the component candidate. An example of the output of this case is 1601 shown in FIG. 16.

Then, the user selects the component of the face from the component candidate group of the face by using the continuous input unit. Thus, the input reception unit 12 receives the selection.

Then, the content constitution unit 133 acquires the selected component candidate of the face from the component candidate group storage unit 111. Then, the output unit 14 outputs the component candidate. An example of the output of this case is 1602 shown in FIG. 16.

Then, the user selects the background "company" having "ID=1" shown in FIG. 11 from the background candidate group storage unit 112. Thus, the input reception unit 12 receives the selection.

Then, the message constitution unit 134 acquires the background candidate of the background "company" having "ID=1" shown in FIG. 11. Then, the output unit 14 outputs the background candidate. An example of the output of this case is 1603 shown in FIG. 16.

Then, the user inputs the time "9 o'clock." Thus, the input reception unit 12 receives the time "9 o'clock."

Then, the message constitution unit 134 acquires the background candidate (clock of 9 o'clock) corresponding to the time "9 o'clock." Then, the output unit 14 outputs the background candidate. An example of the output of this case is 1604 shown in FIG. 16. Note that the second background candidate is the background corresponding to the time.

Then, the user inputs the dialogue "I will buy a cake!." Thus, the input reception unit 12 receives the dialogue. Then, the message constitution unit 134 acquires the dialogue "I will buy a cake!." Then, the output unit 14 outputs the dialogue. An example of the output of this case is 1605 shown in FIG. 16.

Then, the user is assumed to input the message transmission instruction. Thus, the input reception unit 12 receives the message transmission instruction.

Then, the message constitution unit 134 constitutes the message to be transmitted. The message to be transmitted is shown as 1605 in FIG. 16. The message contains the components (face and body), the background, the information corresponding to the time, and the dialogue.

Then, the message transmission unit 15 transmits the constituted message. Note that the transmission destination of the message is not limited.

As explained above, by using the present embodiment, the message containing the content formed by combining a plurality of components can be easily transmitted. Thus, high level communication using the message can be achieved.

In addition, by using the present embodiment, the message for achieving high level communication can be easily created.

In addition, by using the present embodiment, the message containing the content with the face formed by combining a plurality of components can be easily transmitted. Thus, high level communication using the message can be achieved.

In addition, by using the present embodiment, the message containing the content with the body formed by combining a plurality of components can be easily transmitted. Thus, high level communication using the message can be achieved.

In addition, by using the present embodiment, the message containing the background and the content can be easily transmitted. Thus, high level communication using the message can be achieved.

In addition, by using the present embodiment, the message containing the dialogue and the content can be easily transmitted. Thus, high level communication using the message can be achieved.

Furthermore, by using the present embodiment, the message according to the situation can be easily transmitted because the external information is used. Thus, high level communication using the message can be achieved.

Figure 17:
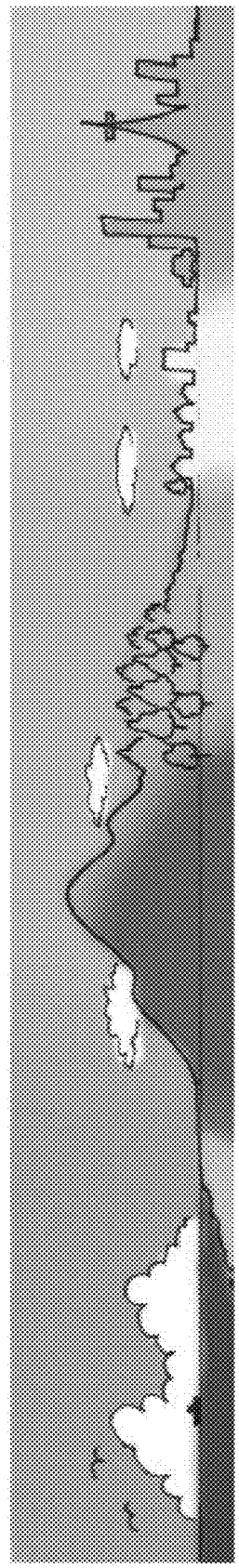
FIG. 17 is a drawing showing an example of the background candidate group concerning the first embodiment.

In the specific example of the present embodiment, the background candidate group storage unit 112 stores the background candidates shown in FIG. 11, for example. However, the background candidate group storage unit 112 is capable of storing the background candidate group shown in FIG. 17. The background candidate group shown in FIG. 17 includes three or more background candidates. In addition, the three or more background candidates have an order. The background candidate group shown in FIG. 17 is an assembly of the background images having a theme of "sea, beach, mountain, forest, countryside, housing complex, and city." The background candidate group shown in FIG. 17 has an order of "sea, beach, mountain, forest, countryside, housing complex, city."

Figure 18:
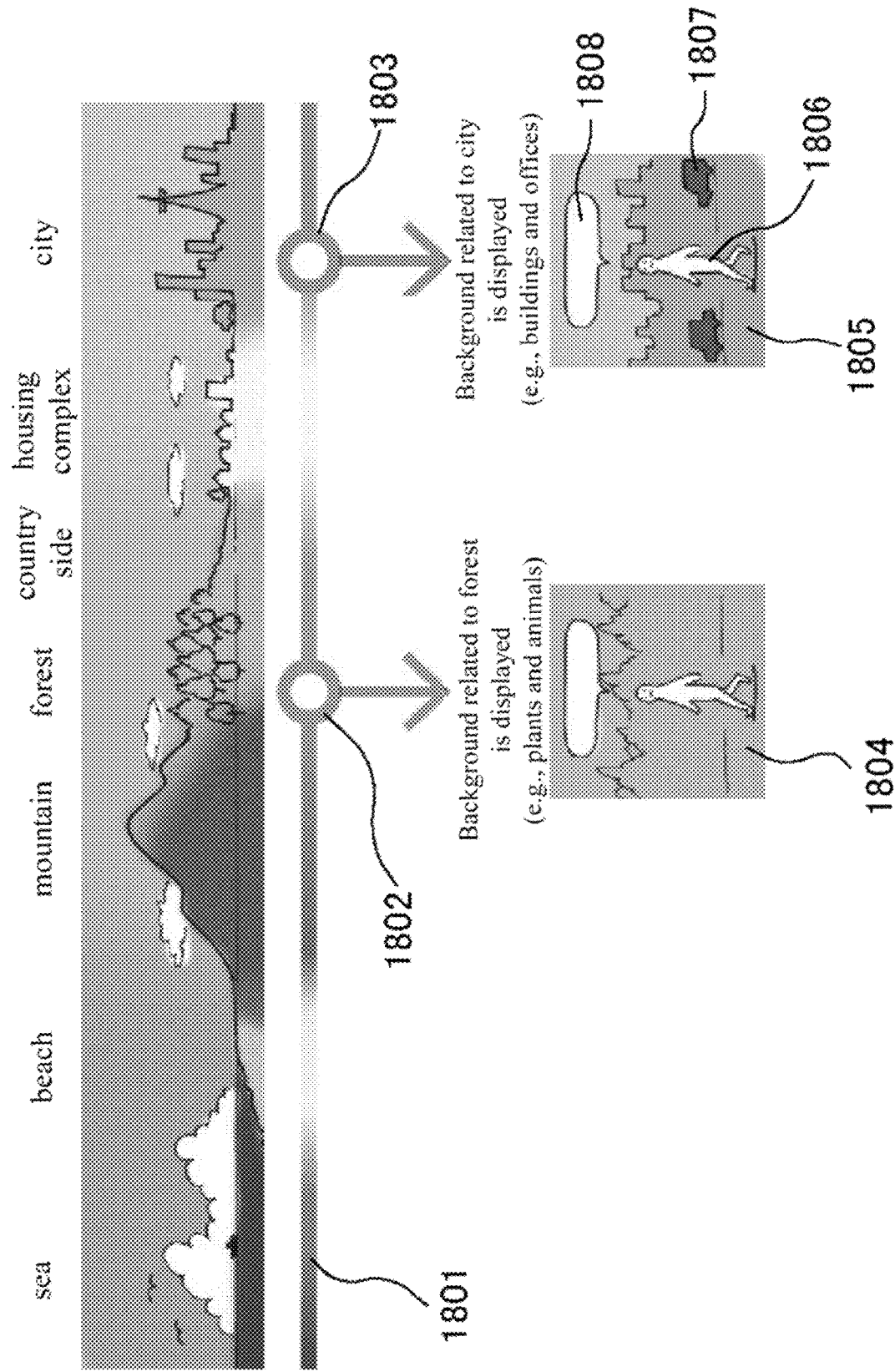
FIG. 18 is a drawing showing an example of the background candidate group and the continuous input unit concerning the first embodiment.

1801 and 1802 shown in FIG. 18 are examples of the continuous input unit. 1801 is a bar constituting the continuous input unit. 1802 and 1803 are the moving object constituting the continuous input unit and indicating the current point. When the user moves the moving object indicating the current point on the continuous input unit, the message constitution unit 134 acquires the background image (shown in 1804 and 1805) by cutting the rectangular shape having a threshold width around the moving object from the background candidate group (image) shown in FIG. 17. Then, the user is assumed to select the content or the component (e.g., 1806 and 1807 in FIG. 18) from the not illustrated content candidate group or component candidate group to arrange the selected content or component on the screen. Furthermore, the user inputs the dialogue in the area 1808 of dialogue. Then, the content constitution unit 133 and the message constitution unit 134 constitute the message by the above described processing.

The processing of the present embodiment can be achieved by the software. The software can be distributed by software download or the like. The software can be distributed by recording the software on a storage medium such as a CD-ROM. Note that this is also applied to the other embodiments in the specification. The software to achieve the message transmission device 1 of the present embodiment is the following program. Namely, in the program, a computer accessible storage medium has a component candidate group storage unit configured to be capable of storing one or more component candidate groups including two, three or more groups of the component candidates which are the candidates of the components constituting the content, and the program enables the computer to function as an input reception unit configured to receive the input for constituting the content including one, two or more components determined by the selection of one component candidate from two or more component candidates included in one component candidate group stored in the component candidate group storage unit by the continuous input unit which is the input unit capable of continuously switching the selection of the candidate, a content constitution unit configured to constitute the content by using the selected one, two or more components according to the input received by the input reception unit, and a message transmission unit configured to transmit the message containing the content constituted by the content constitution unit.

In the above described program, it is preferred that the three or more component candidates are the gradually changed component candidates.

In the above described program, it is preferred that the input reception unit receives the selection of one component candidate selected from the three or more component candidates by the switching input of the continuous input unit which can continuously switch the component candidates, and the computer further functions as an output unit configured to output only the component candidate selected by the switching input from the three or more component candidates.

In the above described program, it is preferred that the computer functions so that the output unit sequentially outputs two or more component candidates shifted by the switching input at a same position when the input reception unit receives the switching input of the continuous input unit.

In the above described program, it is preferred that the component candidates and the components are a part of a face, and the content is the face.

In the above described program, it is preferred that the component candidates and the components are a part of a body, and the content is the body.

It is preferred that the storage medium further includes a background candidate group storage unit capable of storing two or more background candidate groups which are background candidates for constituting the message, the input reception unit, in the program, receives the selection of one background candidate selected from two or more background candidates by a switching input of the continuous input unit which can continuously switch the background candidates, and the computer further functions as a message constitution unit configured to constitute the message by using the content and the background candidate corresponding to the selection of one of the background candidates and the message transmission unit transmits message constituted by the message constitution unit.

In the above described program, it is preferred that the input reception unit also receives a dialogue corresponding to the content, the computer further functions as a message constitution unit configured to constitute the message by using the content constituted by the content constitution unit and the dialogue received by the input reception unit and the message transmission unit transmits the message constituted by the message constitution unit.

In the above described program, it is preferred that the computer further functions as an external information acquisition unit configured to acquire the external information and an automatic selection unit configured to select one component candidate from one of the component candidate groups, one background candidate from one of the background candidate groups, or one component candidate and one background candidate from one of the component candidate groups and one of the background candidate groups using the external information, the content constitution unit constitutes the content by using the one component candidate selected by the automatic selection unit and/or the message constitution unit constitutes the message by using the one background candidate selected by the automatic selection unit.

In the above described program, it is preferred that the external information contains one or more user contexts.

In the above described program, it is preferred that the external information contains one or more application information held by the application.

In the above described program, it is preferred that at least one content candidate group of one or more component candidate groups stored in the storage unit include two, three or more component candidates expressing an emotion of a human.

Figure 19:
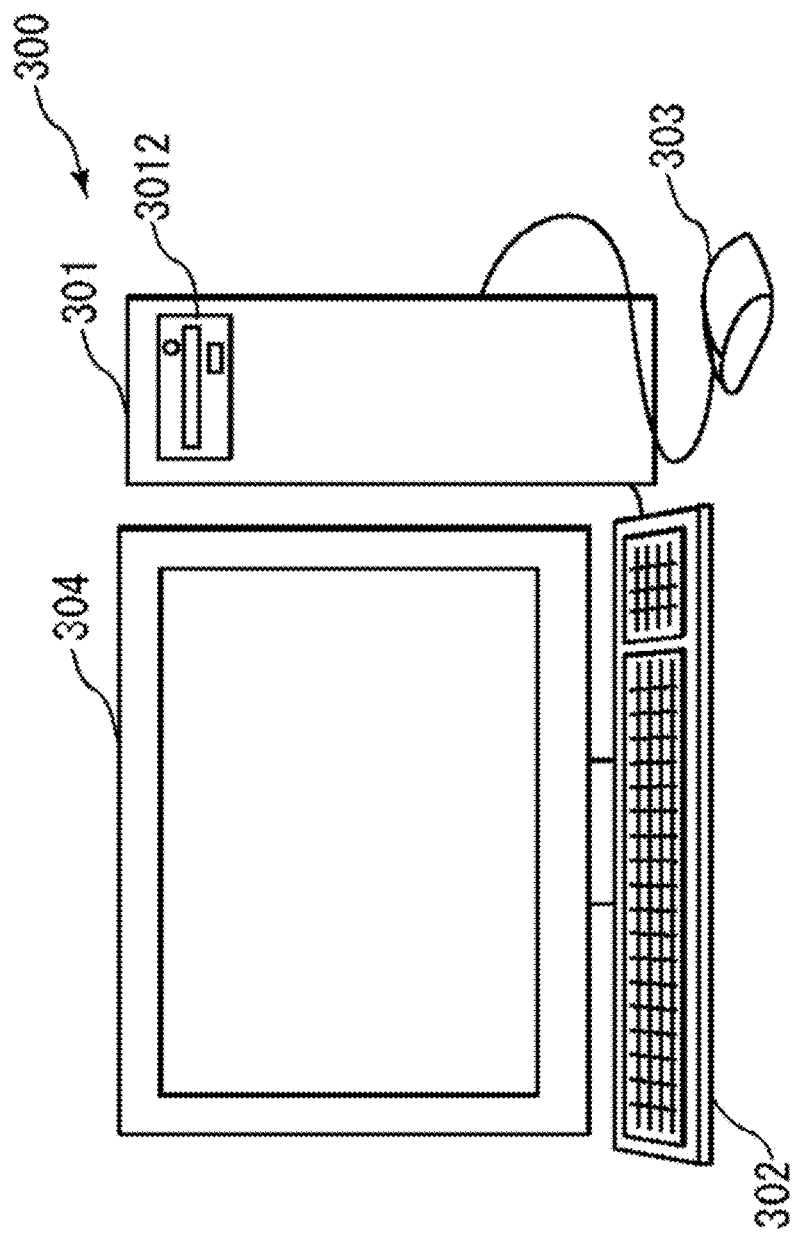
FIG. 19 is a schematic view of the computer system of the first embodiment.
Figure 20:
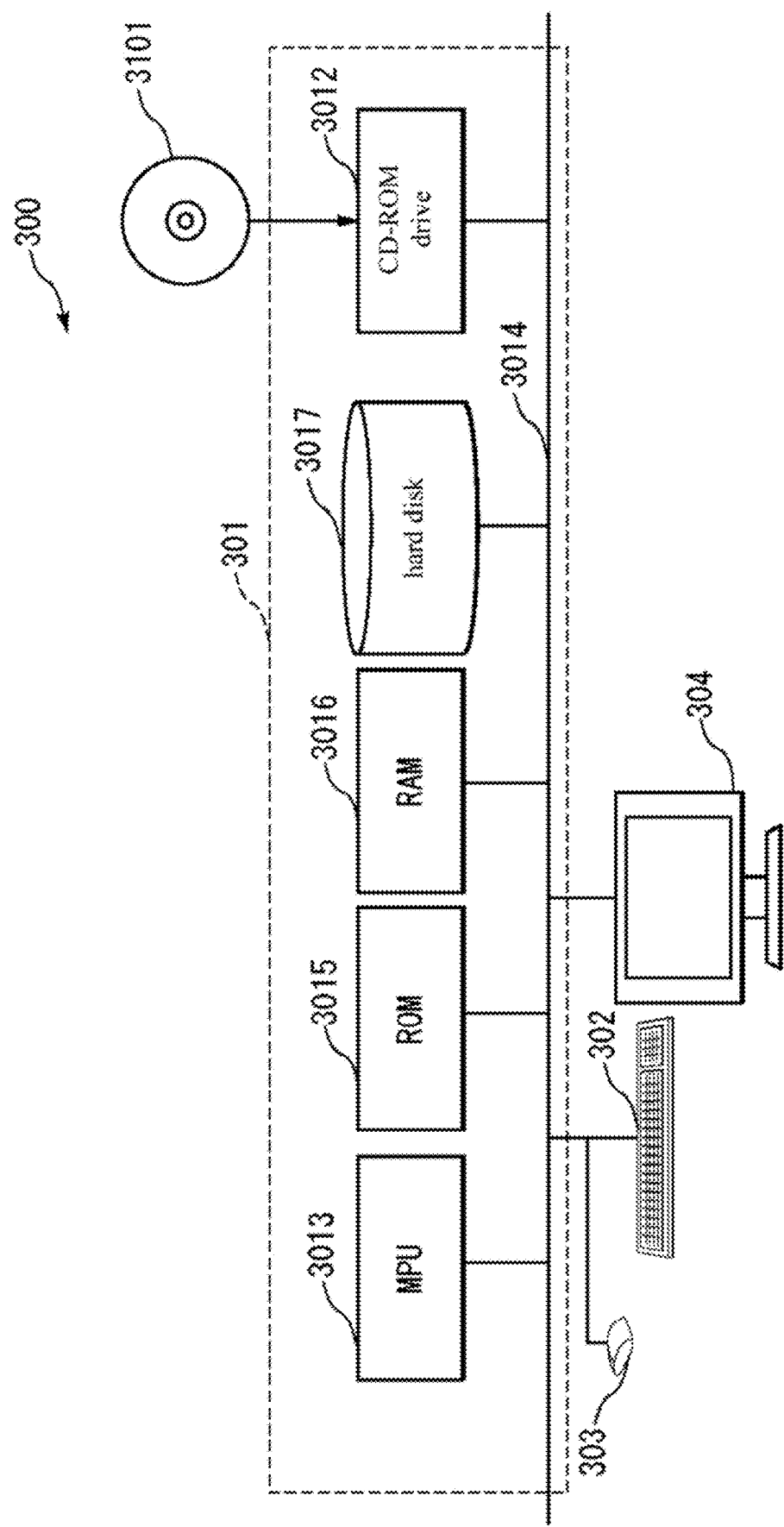
FIG. 20 is a block diagram of the computer system of the first embodiment.

FIG. 19 shows an outer appearance of the computer for executing the programs described in the specification and achieving the message transmission device 1 of the above described various embodiments. The above described embodiments can be achieved by computer hardware and computer programs executed on the computer hardware. FIG. 19 is a schematic view of the computer system 300. FIG. 20 is a block diagram of the computer system 300.

In FIG. 19, the computer system 300 has a computer 301 including a CD-ROM drive, a keyboard 302, a mouse 303 and a monitor 304.

In FIG. 20, the computer 301 has, in addition to a CD-ROM drive 3012, an MPU 3013, a bus 3014 connected to the CD-ROM drive 3012 and the MPU 3013, a ROM 3015 for storing programs such as a boot-up program, a RAM 3016 connected to the MPU 3013 for temporarily storing the instruction of programs and providing a temporary storage space, and a hard disk 3017 for storing application programs, system programs and data. Although not illustrated here, the computer 301 can further have a network card for providing the connection to the LAN.

The program for making the computer system 300 execute the above described functions of the message transmission device 1 of the embodiment can be stored in the CD-ROM 3101, inserted into the CD-ROM drive 3012 and transferred to the hard disk 3017. Alternatively, the program can be transmitted to the computer 301 via a not illustrated network and stored in the hard disk 3017. The program is loaded to the RAM 3016 when executing the program. The program can be loaded from the CD-ROM 3101 or loaded directly from the network.

The program does not necessarily include an operating system or a third-party program which are used for enabling the computer 301 to execute the functions of the message transmission device 1 of the above described embodiment. The program is only required to include an instruction part for accessing the function (module) appropriate for the controlled mode so as to obtain the desired result. The detailed explanation of the computer system 300 is omitted since the operation of the computer system 300 is conventionally known.

In the steps of transmitting and receiving the information in the above described program, the processing performed by the hardware such as the processing performed by a modem and an interface card (processing only performed by the hardware) are not included.

In addition, the computer for executing the above described program can be a single computer or a plurality of computers. Namely, centralized processing is possible although distributed processing is also possible.

In the above described embodiments, it goes without saying that two or more communication means existing in one device can be physically achieved by one medium.

In the above described embodiments, each processing (each function) can be achieved by the centralized processing done by a single device (system) although it can be also achieved by the distributed processing done by a plurality of devices.

Needless to say, the present invention is not limited to the above described embodiments. Various modifications are possible and such modifications are also included in the present invention.

INDUSTRIAL APPLICABILITY

As explained above, the message transmission device of the present invention has an effect capable of achieving high level communication using the message. Thus, the message transmission device of the present invention is useful for the message transmission device or the like.

DESCRIPTION OF THE REFERENCE NUMERALS 1 message transmission device
11 storage unit
12 input reception unit
13 processing unit
14 output unit
15 message transmission unit
16 message reception unit
111 component candidate group storage unit
112 background candidate group storage unit
113 transmission destination information storage unit
131 external information acquisition unit
132 automatic selection unit
133 content constitution unit
134 message constitution unit

What is claimed is:

1. A message transmission device for transmitting a message containing an image, the message transmission device comprising:
   a storage unit configured to store two or more content candidate groups of a component for forming the image of a face, a body or a background;
   an input reception unit configured to receive an instruction for selecting the content candidate groups and receive a switching input of the component for forming the image of the face, the body or the background input from a continuous input unit which switches the component for forming the image of the face, the body or the background sequentially for inputting a selection of the component for forming the image of the face, the body or the background included in the selected content candidate group;
   a content constitution unit configured to sequentially select the component for forming the image of the face, the body or the background from the selected content candidate group according to the switching input of the component for forming the image of the face, the body or the background input from the continuous input unit;
   an output unit configured to sequentially output two or more components for forming the image of the face, the body or the background selected by the switching input at a same position when the component for forming the image of the face, the body or the background is selected according to the switching input; and
   a message transmission unit configured to sequentially transmit messages containing the image of the face, the body or the background which is selected by the switching input while displaying the two or more components at the same position, wherein
   the input reception unit is configured to further receive the instruction for selecting the image containing a letter string or receives an input of the letter string, and
   the message transmission unit is configured to sequentially transmit the message containing the letter string.

2. The message transmission device according to claim 1, further comprising:
   an external information acquisition unit configured to acquire an external information: and
   an automatic selection unit configured to select one of the content candidate groups automatically using the external information, wherein
   the content constitution unit is configured to constitute the content using the one of the content candidate groups selected by the automatic selection unit.

3. The message transmission device according to claim 2, wherein
   the external information contains one or more user contexts.

4. The message transmission device according to claim 3, wherein
   the one or more user contexts contain a dynamic attribute of a user.

5. The message transmission device according to claim 2, wherein
   the external information contains one or more application information held by an application.

6. The message transmission device according to claim 5, wherein
   the one or more application information contain a history information of electronic money used by the application which realizes an electronic money function.

7. The message transmission device according to claim 1, wherein
   the continuous input unit is an interface enabling to select the component from a two-dimensional map having a vertical axis and a horizontal axis.

8. The message transmission device according to claim 1, wherein
   the continuous input unit is an interface enabling to select the component from a two-dimensional map corresponding to an emotion of a human.

9. A message transmission method for transmitting a message containing an image achieved by a storage medium, an input reception unit, a content constitution unit, a message transmission unit, and an output unit, wherein
   the storage medium has a storage unit configured to store two or more content candidate groups of a component for forming the image of a face, a body or a background,
   the method comprising:
      a first input reception step, the input reception unit receiving an instruction for selecting the content candidate groups;
      a second input reception step, the input reception unit receiving a switching input of the component for forming the image of the face, the body or the background input from a continuous input unit which switches the component for forming the image of the face, the body or the background sequentially for inputting a selection of the component for forming the image of the face included in the selected content candidate group;
      a content constitution step, the content constitution unit sequentially selecting the component for forming the image of the face, the body or the background from the selected content candidate group according to the switching input of the component for forming the image of the face, the body or the background input from the continuous input unit;
      an output step, the output unit sequentially outputting two or more components for forming the image of the face, the body or the background selected by the switching input at a same position when the component for forming the image of the face, the body or the background is selected according to the switching input; and
      a message transmission step, the message transmission unit sequentially transmitting messages containing the component for forming the image of the face, the body or the background which is selected by the switching input while displaying the two or more components at the same position, wherein
   the input reception unit further receives the instruction for selecting the image containing a letter string or receives an input of the letter string, and
   the message transmission unit sequentially transmits the message containing the letter string.

* * * * *